United States Patent
Philip et al.

(10) Patent No.: US 11,561,773 B2
(45) Date of Patent: Jan. 24, 2023

(54) PLATFORM FOR RAPID APPLICATION DEVELOPMENT

(71) Applicant: FileOnQ, Inc., Tukwila, WA (US)

(72) Inventors: Manoj Philip, Calgary (CA); Kim Maron Webley, Issaquah, WA (US)

(73) Assignee: FILEONQ, INC., Tukwila, WA (US)

( * ) Notice: Subject to any disclaimer, the term of this patent is extended or adjusted under 35 U.S.C. 154(b) by 0 days.

(21) Appl. No.: 17/511,925

(22) Filed: Oct. 27, 2021

(65) Prior Publication Data

US 2022/0147322 A1    May 12, 2022

Related U.S. Application Data

(63) Continuation of application No. 17/095,345, filed on Nov. 11, 2020, now Pat. No. 11,307,834.

(51) Int. Cl.
| | |
|---|---|
| *G06F 8/34* | (2018.01) |
| *G06F 8/38* | (2018.01) |
| *G06F 9/445* | (2018.01) |
| *G06F 9/455* | (2018.01) |
| *G06F 9/451* | (2018.01) |
| *G06F 8/60* | (2018.01) |

(52) U.S. Cl.
CPC ............ *G06F 8/34* (2013.01); *G06F 8/60* (2013.01); *G06F 9/451* (2018.02)

(58) Field of Classification Search
CPC .............. G06F 8/34; G06F 9/451; G06F 8/60
See application file for complete search history.

(56) References Cited

U.S. PATENT DOCUMENTS 10,248,389 B2 * 4/2019 Castro ................. G06F 8/34

OTHER PUBLICATIONS

Basin et al., A Model-Driven Methodology for Developing Secure Data-Management Applications, 14 pages (Year: 2014).*

* cited by examiner

*Primary Examiner* — Thuy Dao
(74) *Attorney, Agent, or Firm* — Workman Nydegger

(57) ABSTRACT

Embodiments are directed to application development. A data model may include one or more complex field types that each include one or more other fields. A separate data object may be included for each complex field type that defines one or more characteristics of one or more other fields included in a complex field type. An application design window may include one or more complex fields for an application, such that each complex field is associated with a complex field type. The data model may be modified to include another separate data object for each complex field type that is associated with the one or more complex fields, such that item values corresponding to each complex field of the same complex field type are stored in the same other separate data object. The modified data model may be deployed to enable one or more application shells to execute the application.

20 Claims, 15 Drawing Sheets

PLATFORM FOR RAPID APPLICATION DEVELOPMENT

CROSS-REFERENCE TO RELATED APPLICATIONS

This application is a continuation of U.S. patent application Ser. No. 17/095,345 filed on Nov. 11, 2020, entitled "Platform For Rapid Application Development," which application is expressly incorporated herein by reference in its entirety.

TECHNICAL FIELD

The present innovations relate generally to platforms for developing applications and more particularly, but not exclusively, to platforms for developing applications via visual programming.

BACKGROUND

Applications for tasks such as, for example, tracking an item throughout an entirety of the item's lifecycle often requires custom software. Custom software tends to be expensive, in terms of both financial and temporal resources. Some products attempt to make programming easier by pre-building tables. For example, when a software developer using one of these products drags and drops fields in a window, one or more of the pre-built tables is pulled forward. The developer must then write code that defines interactions between the fields. Accordingly, creating custom software with these products requires a highly skilled software developer to write code.

Thus, it is with respect to these considerations and others that the present innovations have been made.

BRIEF DESCRIPTION OF THE DRAWINGS

Non-limiting and non-exhaustive embodiments of the present innovations are described with reference to the following drawings. In the drawings, like reference numerals refer to like parts throughout the various figures unless otherwise specified. For a better understanding of the described innovations, reference will be made to the following Detailed Description of the Various Embodiments, which is to be read in association with the accompanying drawings, wherein.

DETAILED DESCRIPTION OF THE VARIOUS EMBODIMENTS

Figure 1:
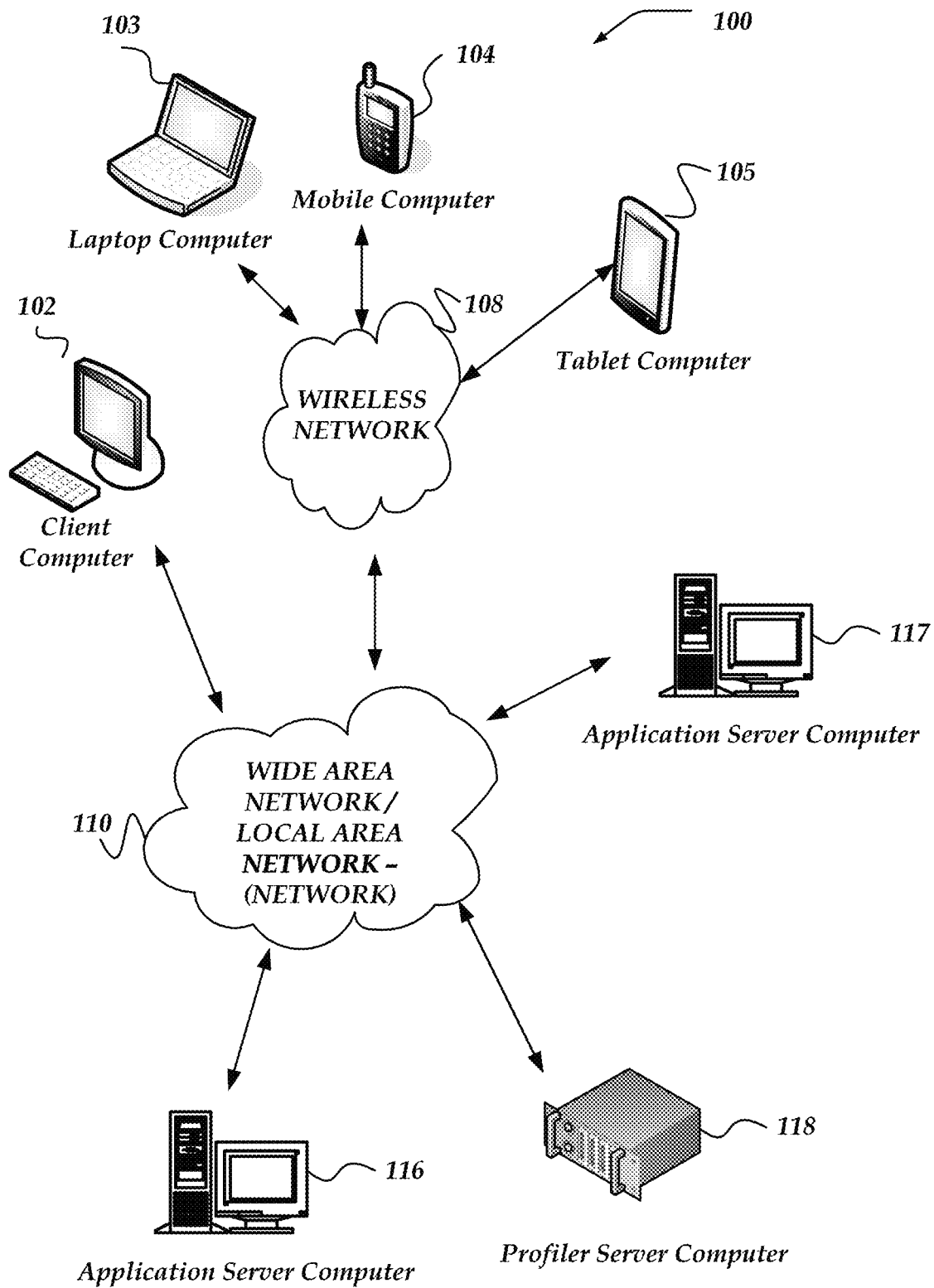
FIG. 1 shows an exemplary system environment in which various embodiments may be implemented.

Various embodiments now will be described more fully hereinafter with reference to the accompanying drawings, which form a part hereof, and which show, by way of illustration, specific exemplary embodiments by which the innovations may be practiced. The embodiments may, however, be embodied in many different forms and should not be construed as limited to the embodiments set forth herein; rather, these embodiments are provided so that this disclosure will be thorough and complete, and will fully convey the scope of the embodiments to those skilled in the art. Among other things, the various embodiments may be methods, systems, media or devices. Accordingly, the various embodiments may take the form of an entirely hardware embodiment, an entirely software embodiment or an embodiment combining software and hardware aspects. The following detailed description is, therefore, not to be taken in a limiting sense.

Throughout the specification and claims, the following terms take the meanings explicitly associated herein, unless the context clearly dictates otherwise. The phrase "in one embodiment" as used herein does not necessarily refer to the same embodiment, though it may. Furthermore, the phrase "in another embodiment" as used herein does not necessarily refer to a different embodiment, although it may. Thus, as described below, various embodiments may be readily combined, without departing from the scope or spirit of the innovations.

In addition, as used herein, the term "or" is an inclusive "or" operator, and is equivalent to the term "and/or," unless the context clearly dictates otherwise. The term "based on" is not exclusive and allows for being based on additional factors not described, unless the context clearly dictates otherwise. In addition, throughout the specification, the meaning of "a," "an," and "the" include plural references. The meaning of "in" includes "in" and "on." Also, throughout the specification and the claims, the use of "when" and "responsive to" do not imply that associated resultant actions are required to occur immediately or within a particular time period. Instead, the terms "when" and "responsive to" are used herein to indicate actions that may occur or be performed in response to one or more conditions being met, unless the context clearly dictates otherwise. Additionally, throughout the specification, the use of "exemplary" does not imply that other embodiments do not perform as well or are not as worthy of illustration. Instead, the term is used herein to emphasize that each element or function described by the term is an example element or function.

For example embodiments, the following terms are also used herein according to the corresponding meaning, unless the context clearly dictates otherwise.

As used herein the term "data model" refers to data structure that may be arranged to represent applications or meta data associated with applications. In some cases, data models may be represented using graphs that include nodes and edges where the nodes represent data objects and the edges represent relationships between the data objects. Also, data models may be implemented using various data formats, including XML, database tables, JSON, CSV files, or the like.

As used herein, the term "data object" refers to objects or tables that represent parts of applications or meta data associated with applications. Data objects may be implemented using various data structures, including objects (e.g., Java objects, C++ objects, or the like), database tables, or the like.

As used herein, the term "field type" refers to types of user-interface elements or controls that are available to include in applications, complex fields, or complex field types. As used herein, the term "simple field type" refers to field types for simple fields. Also as used herein, the term "complex field type" refers to field types for complex fields.

As used herein, the term "field" refers to user-interface controls that are included in applications, complex fields, or complex field types. As used herein, the term "simple field" refers to fields that do not contain other fields, such as a text field, checkbox field, radio button field, drop-down menu field, media field, scrollable list field, or the like. In contrast, as used herein, the term "complex field" refers to fields that include one or more other fields, such as simple fields or other complex fields.

As used herein with regard to fields or field types, the term "properties" refers to characteristics that may affect the appearance of the field themselves rather than affecting the application data values associated with a field. For example, property values of properties may indicate field names, field captions, field prompts, field tool-tips, designer comments, field positions, or the like.

As used herein with regard to fields or field types, the term "definitions" refers to characteristics that control values provided to fields. For example, definition values of definitions may indicate whether a field may be used as part of a search expression, whether the field has an upper case mask, whether the field is required, whether values provided to the field should be carried forward, whether the field appears in browsers, whether the field appears as a read-only display field, whether the field requires a mask, whether values of the field are dependent on one or more values of one or more other fields, whether values of the field are computed, or the like.

As used herein, the term "profiler" refers to engines that are arranged to enable users to design applications. Profilers may generate data models and profile information associated with the applications.

As used herein, the term "profile information" refers to information that is generated for applications, including schema definitions, data models, or the like. For example, profile information for an application may indicate or describe one or more data models, data objects, or the like, that an application shell uses during the execution of the application.

As used herein, the term "application shells" refers to engines that employ profile information, data models, data objects, or the like, to generate, instantiate, execute applications, or the like.

As used herein, the term "meta data" refers to data models that represent field types. Meta data may include information, data models, data objects, or the like, that may be used when designing applications.

As used herein, the term "application data" refers to data models or data objects that represent fields of an application. Application data may be generated during the design of an application and made available to application shells that may generate, instantiate, or execute applications.

The following briefly describes embodiments of the innovations in order to provide a basic understanding of some aspects of the innovations. This brief description is not intended as an extensive overview. It is not intended to identify key or critical elements, or to delineate or otherwise narrow the scope. Its purpose is merely to present some concepts in a simplified form as a prelude to the more detailed description that is presented later.

Briefly stated, various embodiments are directed to enabling users to rapidly develop applications. In some of the various embodiments, profilers included in platforms for rapid application development may provide user interfaces that include application control palettes. In some embodiments, an application control palette may include various field types. Application designers may be enabled to design applications based on field types included in application control palettes.

In one or more of the various embodiments, profilers may provide complex field type design windows in user interfaces. In some of the various embodiments, users may be enabled to design complex field types by placing or modifying in complex field type design windows various fields of field types selected from application control palettes. In some embodiments, profilers may add designed complex field types to application control palettes.

In one or more of the various embodiments, adding designed complex field types to application control palettes may include generating or populating data objects included in data models, such as meta data. In some of the various embodiments, profilers may append data objects with records or attributes associated with complex field types, such as field type objects. In some embodiments, profilers may populate appended records or attributes with values that identify complex field types. In some of the various embodiments, profilers may generate data objects that include records or attributes associated with various definitions for complex field types, such as definition objects. In some embodiments, profilers may populate records or attributes included in definition objects with definition values of various definitions for complex field types.

In one or more of the various embodiments, profilers may provide application design windows in user interfaces. In some of the various embodiments, users may be enabled to design applications by placing or modifying in application design windows fields of various field types selected from application control palettes. In some embodiments, profilers may deploy designed applications. In some embodiments, application shells may execute deployed applications.

In one or more of the various embodiments, deploying designed applications may include generating or populating data models or data objects associated with the applications, such as application data. In some of the various embodiments, profilers may generate item objects that represent items modeled by applications and may also generate supporting data objects that indicate definition values or property values of various definitions or properties for fields included in the applications. In some embodiments, profilers may generate complex field type item objects that represent items modeled by complex fields included in applications. In some embodiments, profilers may generate profile information that, in combination with one or more data models (e.g., meta data, application data, or the like), represent applications. In some embodiments, application shells may generate or execute deployed applications based on profile information, meta data, application data, or the like.

Also briefly stated, various embodiments are directed to application development. In one or more of the various embodiments, a data model may be provided. In some of the various embodiments, the data model may include one or more complex field types that each include one or more other fields. In some embodiments, the data model may include a separate data object for each complex field type that defines one or more characteristics of the one or more other fields included in one of the one or more complex field types.

In one or more of the various embodiments, an application design window may be provided. In some of the various embodiments, the application design window may include one or more complex fields for an application, such that each complex field is associated with one of the one or more complex field types.

In one or more of the various embodiments, the data model may be modified to include another separate data object for each complex field type that is associated with the one or more complex fields, such that item values corresponding to each complex field of the same complex field type are stored in the same other separate data object.

In one or more of the various embodiments, the modified data model may be deployed to enable one or more application shells to execute the application.

In one or more of the various embodiments, a complex field type design window may be provided. In some of the various embodiments, the complex field type design window may include one or more fields for another complex field type. In one or more of the various embodiments, the data model may be modified to include an additional separate data object for the other complex field type that defines one or more characteristics of the one or more fields included in the complex field type design window. In one or more of the various embodiments, one or more application control palettes may be provided. In some of the various embodiments, the one or more application control palettes may include the one or more complex field types and the other complex field type.

In one or more of the various embodiments, providing the data model may further include providing an item data object that includes item values that correspond to each field included in the application design window, such that one or more item values included in the item data object reference item values that are stored in one or more separate data objects that correspond to the one or more complex field types.

In one or more of the various embodiments, the one or more other fields may be one or more of edit controls, list controls, buttons, checkbox buttons, radio buttons, text area controls, grid controls, slider controls, spin controls, images, media controls, labels, group controls, or other complex fields.

In one or more of the various embodiments, providing the data model may further include providing one or more further data objects that define one or more other characteristics of each field included in the application design window, such that the one or more other characteristics indicate one or more of a position, size, color, font, or font-style of each field in the application design window.

In one or more of the various embodiments, each separate data object for the one or more complex field types may indicate a position of the one or more other fields included in one of the one or more complex field types.

In one or more of the various embodiments, deploying the modified data model may further include providing an application profile associated with the modified data model, such that the application profile includes one or more references to the modified data model. In some of the various embodiments, deploying the modified data model may further include providing the application profile to the one or more application shells for execution, such that the one or more application shells include one or more of a web application shell or a native application shell.

In one or more of the various embodiments, deploying the modified data model may further include binding the one or more complex fields included in the data model and each other field included in the application design window to one or more user-interface controls.

Illustrated Operating Environment

FIG. 1 shows components of one embodiment of an environment in which embodiments of the innovations may be practiced. Not all of the components may be required to practice the innovations, and variations in the arrangement and type of the components may be made without departing from the spirit or scope of the innovations. As shown, system 100 of FIG. 1 includes local area networks (LANs)/wide area networks (WANs)—(network) 110, wireless network 108, client computers 102-105, Application Server Computer 116, Application Server Computer 117, Profiler Server Computer 118, or the like.

One or more embodiments of client computers 102-105 is described in more detail below in conjunction with FIG. 2. In one embodiment, some of client computers 102-105 may operate over one or more wired or wireless networks, such as networks 108 or 110. Generally, client computers 102-105 may include virtually any computer capable of communicating over a network to send and receive information, perform various online activities, offline actions, or the like. In one embodiment, one or more of client computers 102-105 may be configured to operate within a business or other entity to perform a variety of services for the business or other entity. For example, client computers 102-105 may be configured to operate as a web server, firewall, client application, media player, mobile telephone, game console, desktop computer, or the like. However, client computers 102-105 are not constrained to these services and may also be employed, for example, as for end-user computing in other embodiments. It should be recognized that more or fewer client computers (as shown in FIG. 1) may be included within a system such as described herein, and embodiments are therefore not constrained by the number or type of client computers employed.

Computers that may operate as client computer 102 may include computers that typically connect using a wired or wireless communications medium such as personal computers, multiprocessor systems, microprocessor-based or programmable electronic devices, network PCs, or the like. In some embodiments, client computers 102-105 may include virtually any portable computer capable of connecting to another computer and receiving information such as laptop computer 103, mobile computer 104, tablet computers 105, or the like. However, portable computers are not so limited and may also include other portable computers such as cellular telephones, display pagers, radio frequency (RF) devices, infrared (IR) devices, Personal Digital Assistants (PDAs), handheld computers, wearable computers, integrated devices combining one or more of the preceding computers, or the like. As such, client computers 102-105 typically range widely in terms of capabilities and features. Moreover, client computers 102-105 may access various computing applications, including a browser, or other web-based application.

A web-enabled client computer may include a browser application that is configured to send requests and receive responses over the web. The browser application may be configured to receive and display graphics, text, multimedia, or the like, employing virtually any web-based language. In one embodiment, the browser application is enabled to employ JavaScript, HyperText Markup Language (HTML), eXtensible Markup Language (XML), JavaScript Object Notation (JSON), Cascading Style Sheets (CS S), or the like, or combination thereof, to display and send a message. In one embodiment, a user of the client computer may employ the browser application to perform various activities over a network (online). However, another application may also be used to perform various online activities.

Client computers 102-105 also may include one or more other client applications that are configured to receive or send content between another computer. The client application may include a capability to send or receive content or the like. The client application may further provide information that identifies itself, including a type, capability, name, or the like. In one embodiment, client computers 102-105 may uniquely identify themselves through any of a variety of mechanisms, including an Internet Protocol (IP) address, a phone number, Mobile Identification Number (MIN), an electronic serial number (ESN), a client certificate, or another device identifier. Such information may be provided in one or more network packets, or the like, sent between other client computers, application server computer 116, application server computer 117, profiler server computer 118, or other computers.

Client computers 102-105 may further be configured to include a client application that enables an end-user to log into an end-user account that may be managed by another computer, such as application server computer 116, application server computer 117, profiler server computer 118, or the like. Such an end-user account, in one non-limiting example, may be configured to enable the end-user to manage one or more online activities, including in one non-limiting example, project management, software development, system administration, configuration management, search activities, social networking activities, browse various websites, communicate with other users, or the like. Further, client computers may be arranged to enable users to provide configuration information, or the like, to network monitoring computer 118. Also, client computers may be arranged to enable users to display reports, interactive user-interfaces, or results provided by network monitoring computer 118.

Wireless network 108 is configured to couple client computers 103-105 and its components with network 110. Wireless network 108 may include any of a variety of wireless sub-networks that may further overlay stand-alone ad-hoc networks, or the like to provide an infrastructure-oriented connection for client computers 103-105. Such sub-networks may include mesh networks, Wireless LAN (WLAN) networks, cellular networks, or the like. In one embodiment, the system may include more than one wireless network.

Wireless network 108 may further include an autonomous system of terminals, gateways, routers, or the like connected by wireless radio links, or the like. These connectors may be configured to move freely and randomly and organize themselves arbitrarily, such that the topology of wireless network 108 may change rapidly.

Wireless network 108 may further employ a plurality of access technologies including 2nd (2G), 3rd (3G), 4th (4G) 5th (5G) generation radio access for cellular systems, WLAN, Wireless Router (WR) mesh, or the like. Access technologies such as 2G, 3G, 4G, 5G, and future access networks may enable wide area coverage for mobile computers, such as client computers 103-105 with various degrees of mobility. In one non-limiting example, wireless network 108 may enable a radio connection through a radio network access such as Global System for Mobil communication (GSM), General Packet Radio Services (GPRS), Enhanced Data GSM Environment (EDGE), code division multiple access (CDMA), time division multiple access (TDMA), Wideband Code Division Multiple Access (WCDMA), High Speed Downlink Packet Access (HSDPA), Long Term Evolution (LTE), or the like. In essence, wireless network 108 may include virtually any wireless communication mechanism by which information may travel between client computers 103-105 and another computer, network, a cloud-based network, a cloud instance, or the like.

Network 110 is configured to couple network computers with other computers, including, application server computer 116, application server computer 117, profiler server computer 118, client computers 102-105 through wireless network 108, or the like. Network 110 is enabled to employ any form of computer readable media for communicating information from one electronic device to another. Also, network 110 can include the Internet in addition to local area networks (LANs), wide area networks (WANs), direct connections, such as through a universal serial bus (USB) port, Ethernet port, other forms of computer-readable media, or any combination thereof. In an interconnected set of LANs, including those based on differing architectures and protocols, a router acts as a link between LANs, enabling messages to be sent from one to another. In addition, communication links within LANs typically include twisted wire pair or coaxial cable, while communication links between networks may utilize analog telephone lines, full or fractional dedicated digital lines including T1, T2, T3, and T4, or other carrier mechanisms including, for example, E-carriers, Integrated Services Digital Networks (ISDNs), Digital Subscriber Lines (DSLs), wireless links including satellite links, or other communications links known to those skilled in the art. Moreover, communication links may further employ any of a variety of digital signaling technologies, including without limit, for example, DS-0, DS-1, DS-2, DS-3, DS-4, OC-3, OC-12, OC-48, or the like. Furthermore, remote computers and other related electronic devices could be remotely connected to either LANs or WANs via a modem and temporary telephone link. In one embodiment, network 110 may be configured to transport information of an Internet Protocol (IP).

Additionally, communication media typically embodies computer readable instructions, data structures, program modules, or other transport mechanism and includes any information non-transitory delivery media or transitory delivery media. By way of example, communication media includes wired media such as twisted pair, coaxial cable, fiber optics, wave guides, and other wired media and wireless media such as acoustic, RF, infrared, and other wireless media.

One embodiment of application server computer 116, application server computer 117, or profiler server computer 118 is described in more detail below in conjunction with FIG. 3. Briefly, however, application server computer 116-117 includes virtually any network computer capable of hosting applications or providing services in network environment.

One embodiment of profiler server computer 118 is described in more detail below in conjunction with FIG. 3. Briefly, however, profiler server computer 118 may include virtually any network computer capable of generating all or part of a profile. While profiler server computer 118 is shown as a network computer, one or more of client computers 102-105 may perform some or all of the functions of profiler server computer, either online or offline.

Although FIG. 1 illustrates application server computer 116, application server computer 117, and profiler server device 118, each as a single computer, the innovations or embodiments are not so limited. For example, one or more functions of application server computers 116-117, profiler server computer 118, or the like may be distributed across one or more distinct network computers. Moreover, in one or more embodiments, profiler server computer 118 may be implemented using a plurality of network computers. Further, in one or more of the various embodiments, application server computers 116-117 or profiler server computer 118 may be implemented using one or more cloud instances in one or more cloud networks. Accordingly, these innovations and embodiments are not to be construed as being limited to a single environment, and other configurations, and other architectures are also envisaged.

Illustrative Client Computer

Figure 2:
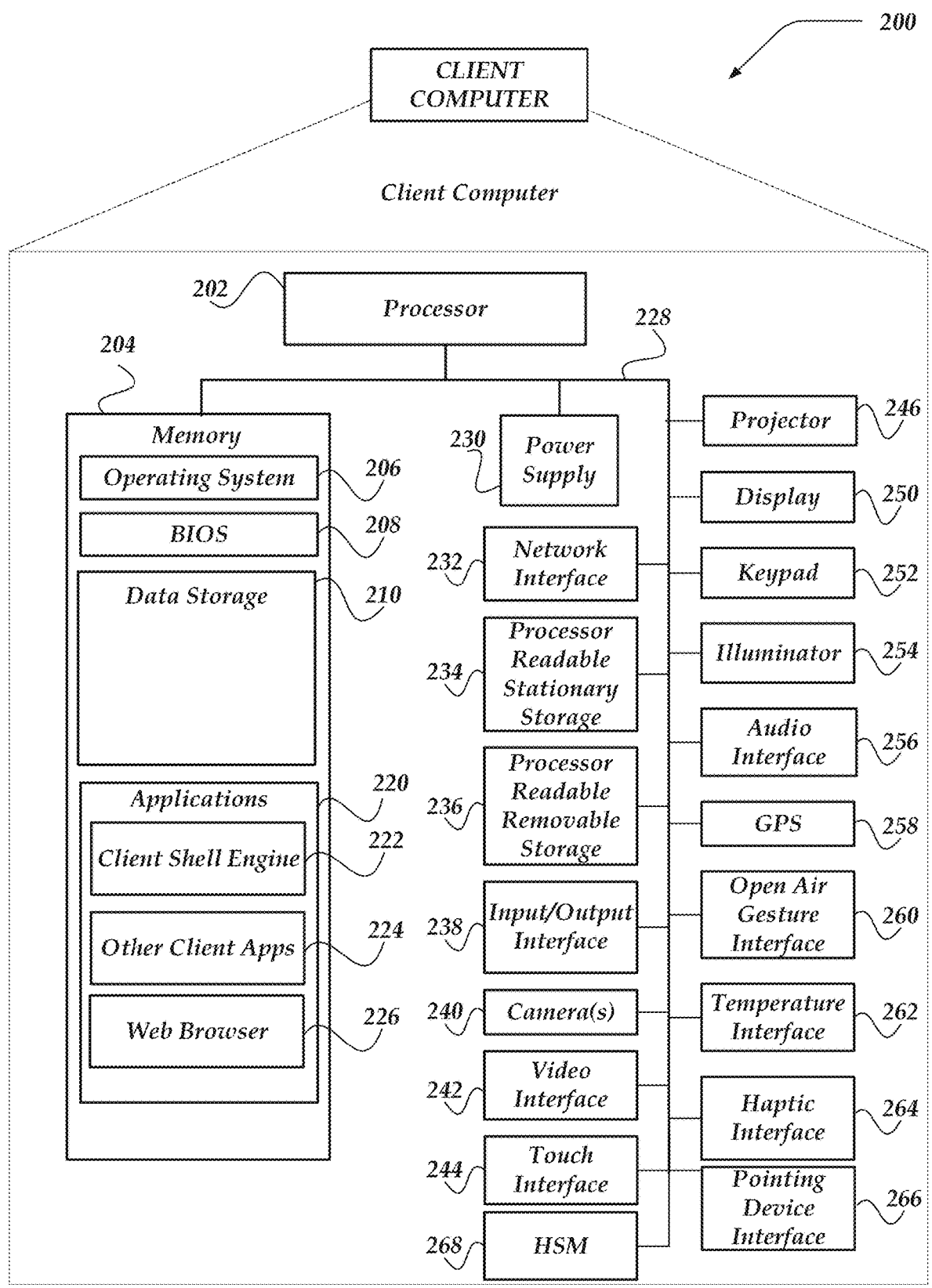
FIG. 2 illustrates a schematic embodiment of an exemplary client computer.

FIG. 2 shows one embodiment of client computer 200 that may include many more or less components than those shown. Client computer 200 may represent, for example, one or more embodiments of mobile computers or client computers shown in FIG. 1.

Client computer 200 may include processor 202 in communication with memory 204 via bus 228. Client computer 200 may also include power supply 230, network interface 232, audio interface 256, display 250, keypad 252, illuminator 254, video interface 242, input/output interface 238, haptic interface 264, global positioning systems (GPS) receiver 258, open air gesture interface 260, temperature interface 262, camera(s) 240, projector 246, pointing device interface 266, processor-readable stationary storage device 234, and processor-readable removable storage device 236. Client computer 200 may optionally communicate with a base station (not shown), or directly with another computer. And in one embodiment, although not shown, a gyroscope may be employed within client computer 200 to measuring or maintaining an orientation of client computer 200.

Power supply 230 may provide power to client computer 200. A rechargeable or non-rechargeable battery may be used to provide power. The power may also be provided by an external power source, such as an AC adapter or a powered docking cradle that supplements or recharges the battery.

Network interface 232 includes circuitry for coupling client computer 200 to one or more networks, and is constructed for use with one or more communication protocols and technologies including, but not limited to, protocols and technologies that implement any portion of the OSI model for mobile communication (GSM), CDMA, time division multiple access (TDMA), UDP, TCP/IP, SMS, MMS, GPRS, WAP, UWB, WiMax, SIP/RTP, GPRS, EDGE, WCDMA, LTE, UMTS, OFDM, CDMA2000, EV-DO, HSDPA, or any of a variety of other wireless communication protocols. Network interface 232 is sometimes known as a transceiver, transceiving device, or network interface card (NIC).

Audio interface 256 may be arranged to produce and receive audio signals such as the sound of a human voice. For example, audio interface 256 may be coupled to a speaker and microphone (not shown) to enable telecommunication with others or generate an audio acknowledgement for some action. A microphone in audio interface 256 can also be used for input to or control of client computer 200, e.g., using voice recognition, detecting touch based on sound, or the like.

Display 250 may be a liquid crystal display (LCD), gas plasma, electronic ink, light emitting diode (LED), Organic LED (OLED) or any other type of light reflective or light transmissive display that can be used with a computer. Display 250 may also include a touch interface 244 arranged to receive input from an object such as a stylus or a digit from a human hand, and may use resistive, capacitive, surface acoustic wave (SAW), infrared, radar, or other technologies to sense touch or gestures.

Projector 246 may be a remote handheld projector or an integrated projector that is capable of projecting an image on a remote wall or any other reflective object such as a remote screen.

Video interface 242 may be arranged to capture video images, such as a still photo, a video segment, an infrared video, or the like. For example, video interface 242 may be coupled to a digital video camera, a web-camera, or the like. Video interface 242 may comprise a lens, an image sensor, and other electronics. Image sensors may include a complementary metal-oxide-semiconductor (CMOS) integrated circuit, charge-coupled device (CCD), or any other integrated circuit for sensing light.

Keypad 252 may comprise any input device arranged to receive input from a user. For example, keypad 252 may include a push button numeric dial, or a keyboard. Keypad 252 may also include command buttons that are associated with selecting and sending images.

Illuminator 254 may provide a status indication or provide light. Illuminator 254 may remain active for specific periods of time or in response to event messages. For example, when illuminator 254 is active, it may backlight the buttons in keypad 252 and stay on while the client computer is powered. Also, illuminator 254 may backlight these buttons in various patterns when particular actions are performed, such as dialing another client computer. Illuminator 254 may also cause light sources positioned within a transparent or translucent case of the client computer to illuminate in response to actions.

Further, client computer 200 may also comprise hardware security module (HSM) 268 for providing additional tamper resistant safeguards for generating, storing, or using security/cryptographic information such as keys, digital certificates, passwords, passphrases, two-factor authentication information, or the like. In some embodiments, hardware security module may be employed to support one or more standard public key infrastructures (PKI), and may be employed to generate, manage, or store key pairs or the like. In some embodiments, HSM 268 may be a stand-alone computer, in other cases, HSM 268 may be arranged as a hardware card that may be added to a client computer.

Client computer 200 may also comprise input/output interface 238 for communicating with external peripheral devices or other computers such as other client computers and network computers. The peripheral devices may include an audio headset, virtual reality headsets, display screen glasses, remote speaker system, remote speaker and microphone system, or the like. Input/output interface 238 can utilize one or more technologies, such as Universal Serial Bus (USB), Infrared, Wi-Fi™ WiMax, Bluetooth™, or the like.

Input/output interface 238 may also include one or more sensors for determining geolocation information (e.g., GPS), monitoring electrical power conditions (e.g., voltage sensors, current sensors, frequency sensors, and so on), monitoring weather (e.g., thermostats, barometers, anemometers, humidity detectors, precipitation scales, or the like), or the like. Sensors may be one or more hardware sensors that collect or measure data that is external to client computer 200.

Haptic interface 264 may be arranged to provide tactile feedback to a user of the client computer. For example, the haptic interface 264 may be employed to vibrate client computer 200 in a particular way when another user of a computer is calling. Temperature interface 262 may be used to provide a temperature measurement input or a temperature changing output to a user of client computer 200. Open air gesture interface 260 may sense physical gestures of a user of client computer 200, for example, by using single or stereo video cameras, radar, a gyroscopic sensor inside a computer held or worn by the user, or the like. Camera 240 may be used to track physical eye movements of a user of client computer 200.

GPS transceiver 258 can determine the physical coordinates of client computer 200 on the surface of the Earth, which typically outputs a location as latitude and longitude values. GPS transceiver 258 can also employ other geo-positioning mechanisms, including, but not limited to, triangulation, assisted GPS (AGPS), Enhanced Observed Time Difference (E-OTD), Cell Identifier (CI), Service Area Identifier (SAI), Enhanced Timing Advance (ETA), Base Station Subsystem (BSS), or the like, to further determine the physical location of client computer 200 on the surface of the Earth. It is understood that under different conditions, GPS transceiver 258 can determine a physical location for client computer 200. In one or more embodiments, however, client computer 200 may, through other components, provide other information that may be employed to determine a physical location of the client computer, including for example, a Media Access Control (MAC) address, IP address, or the like.

Human interface components can be peripheral devices that are physically separate from client computer 200, allowing for remote input or output to client computer 200. For example, information routed as described here through human interface components such as display 250 or keyboard 252 can instead be routed through network interface 232 to appropriate human interface components located remotely. Examples of human interface peripheral components that may be remote include, but are not limited to, audio devices, pointing devices, keypads, displays, cameras, projectors, or the like. These peripheral components may communicate over a Pico Network such as Bluetooth™ Zigbee™, or the like. One non-limiting example of a client computer with such peripheral human interface components is a wearable computer, which might include a remote pico projector along with one or more cameras that remotely communicate with a separately located client computer to sense a user's gestures toward portions of an image projected by the pico projector onto a reflected surface such as a wall or the user's hand.

A client computer may include web browser application 226 that is configured to receive and to send web pages, web-based messages, graphics, text, multimedia, or the like. The client computer's browser application may employ virtually any programming language, including a wireless application protocol messages (WAP), or the like. In one or more embodiments, the browser application is enabled to employ Handheld Device Markup Language (HDML), Wireless Markup Language (WML), WMLScript, JavaScript, Standard Generalized Markup Language (SGML), HyperText Markup Language (HTML), eXtensible Markup Language (XML), HTML5, or the like.

Memory 204 may include RAM, ROM, or other types of memory. Memory 204 illustrates an example of computer-readable storage media (devices) for storage of information such as computer-readable instructions, data structures, program modules or other data. Memory 204 may store BIOS 208 for controlling low-level operation of client computer 200. The memory may also store operating system 206 for controlling the operation of client computer 200. It will be appreciated that this component may include a general-purpose operating system such as a version of UNIX, or LINUX™, or a specialized client computer communication operating system such as Windows Phone™, or the Symbian® operating system. The operating system may include, or interface with a Java virtual machine module that enables control of hardware components or operating system operations via Java application programs.

Memory 204 may further include one or more data storage 210, which can be utilized by client computer 200 to store, among other things, applications 220 or other data. For example, data storage 210 may also be employed to store information that describes various capabilities of client computer 200. The information may then be provided to another device or computer based on any of a variety of methods, including being sent as part of a header during a communication, sent upon request, or the like. Data storage 210 may also be employed to store social networking information including address books, buddy lists, aliases, user profile information, or the like. Data storage 210 may further include program code, data, algorithms, or the like for use by a processor, such as processor 202 to execute and perform actions. In one embodiment, one or more portions of data storage 210 might also be stored in another component of client computer 200, including, but not limited to, non-transitory processor-readable removable storage device 236, processor-readable stationary storage device 234, or even external to the client computer.

Applications 220 may include computer executable instructions which, when executed by client computer 200, transmit, receive, or otherwise process instructions and data. Applications 220 may include, for example, client shell engine 222, other client applications 224, web browser 226, or the like. Client computers may be arranged to exchange communications, such as queries, searches, messages, notification messages, event messages, alerts, performance metrics, log data, API calls, or the like, combination thereof, with application servers or network monitoring computers.

Other examples of application programs include calendars, search programs, email client applications, IM applications, SMS applications, Voice Over Internet Protocol (VOIP) applications, contact managers, task managers, transcoders, database programs, word processing programs, security applications, spreadsheet programs, games, search programs, and so forth.

Additionally, in one or more embodiments (not shown in the figures), client computer 200 may include one or more embedded logic hardware devices instead of one or more CPUs, such as an Application Specific Integrated Circuits (ASICs), Field Programmable Gate Arrays (FPGAs), Programmable Array Logics (PALs), or the like, or combination thereof. The one or more embedded logic hardware devices may directly execute embedded logic to perform actions. Also, in one or more embodiments (not shown in the figures), client computer 200 may include one or more hardware microcontrollers instead of one or more CPUs. In one or more embodiments, the one or more microcontrollers may directly execute their own embedded logic to perform actions and access its own internal memory and its own external Input and Output Interfaces (e.g., hardware pins or wireless transceivers) to perform actions as a System On a Chip (SOC), or the like.

Illustrative Network Computer

Figure 3:
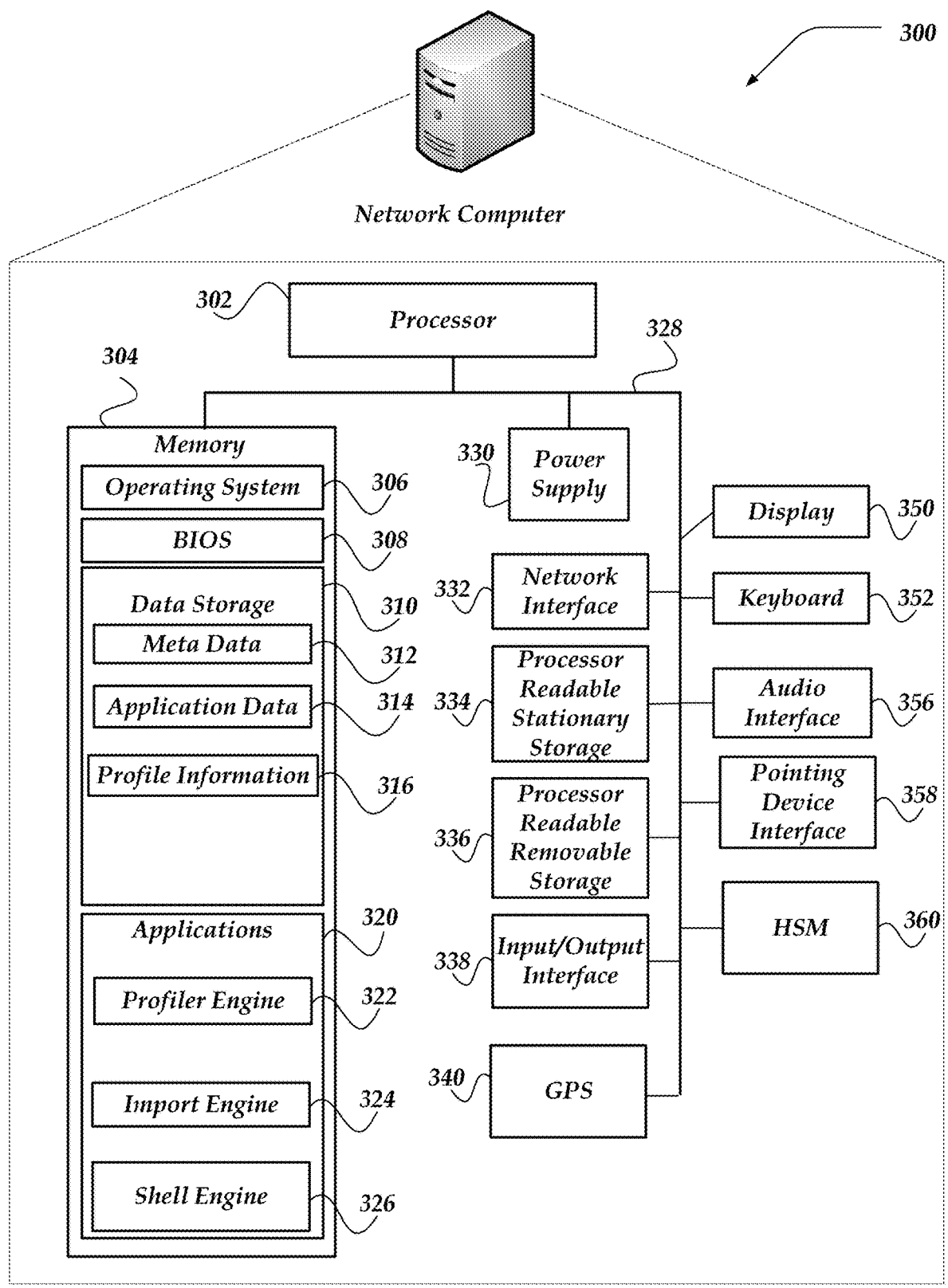
FIG. 3 shows a schematic embodiment of an exemplary network computer.

FIG. 3 shows one embodiment of network computer 300 that may be included in a system implementing one or more of the various embodiments. Network computer 300 may include many more or less components than those shown in FIG. 3. However, the components shown are sufficient to disclose an illustrative embodiment for practicing these innovations. Network computer 300 may represent, for example, one embodiment of one or more of application server computers 116-117 or profiler server computer 118 of FIG. 1.

As shown in the figure, network computer 300 includes a processor 302 that may be in communication with a memory 304 via a bus 328. In some embodiments, processor 302 may be comprised of one or more hardware processors, or one or more processor cores. In some cases, one or more of the one or more processors may be specialized processors designed to perform one or more specialized actions, such as those described herein. Network computer 300 also includes a power supply 330, network interface 332, audio interface 356, display 350, keyboard 352, input/output interface 338, processor-readable stationary storage device 334, and processor-readable removable storage device 336. Power supply 330 provides power to network computer 300.

Network interface 332 includes circuitry for coupling network computer 300 to one or more networks, and is constructed for use with one or more communication protocols and technologies including, but not limited to, protocols and technologies that implement any portion of the Open Systems Interconnection model (OSI model), global system for mobile communication (GSM), code division multiple access (CDMA), time division multiple access (TDMA), user datagram protocol (UDP), transmission control protocol/Internet protocol (TCP/IP), Short Message Service (SMS), Multimedia Messaging Service (MMS), general packet radio service (GPRS), WAP, ultra wide band (UWB), IEEE 802.16 Worldwide Interoperability for Microwave Access (WiMax), Session Initiation Protocol/Real-time Transport Protocol (SIP/RTP), or any of a variety of other wired and wireless communication protocols. Network interface 332 is sometimes known as a transceiver, transceiving device, or network interface card (NIC). Network computer 300 may optionally communicate with a base station (not shown), or directly with another computer.

Audio interface 356 is arranged to produce and receive audio signals such as the sound of a human voice. For example, audio interface 356 may be coupled to a speaker and microphone (not shown) to enable telecommunication with others or generate an audio acknowledgement for some action. A microphone in audio interface 356 can also be used for input to or control of network computer 300, for example, using voice recognition.

Display 350 may be a liquid crystal display (LCD), gas plasma, electronic ink, light emitting diode (LED), Organic LED (OLED) or any other type of light reflective or light transmissive display that can be used with a computer. Display 350 may be a handheld projector or pico projector capable of projecting an image on a wall or other object.

Network computer 300 may also comprise input/output interface 338 for communicating with external devices or computers not shown in FIG. 3. Input/output interface 338 can utilize one or more wired or wireless communication technologies, such as USB™, Firewire™, Wi-Fi™, WiMax, Thunderbolt™, Infrared, Bluetooth™, Zigbee™, serial port, parallel port, and the like.

Also, input/output interface 338 may also include one or more sensors for determining geolocation information (e.g., GPS), monitoring electrical power conditions (e.g., voltage sensors, current sensors, frequency sensors, and so on), monitoring weather (e.g., thermostats, barometers, anemometers, humidity detectors, precipitation scales, or the like), or the like. Sensors may be one or more hardware sensors that collect or measure data that is external to network computer 300. Human interface components can be physically separate from network computer 300, allowing for remote input or output to network computer 300. For example, information routed as described here through human interface components such as display 350 or keyboard 352 can instead be routed through the network interface 332 to appropriate human interface components located elsewhere in the network. Human interface components include any component that allows the computer to take input from, or send output to, a human user of a computer. Accordingly, pointing devices such as mice, styluses, track balls, or the like, may communicate through pointing device interface 358 to receive user input.

GPS transceiver 340 can determine the physical coordinates of network computer 300 on the surface of the Earth, which typically outputs a location as latitude and longitude values. GPS transceiver 340 can also employ other geo-positioning mechanisms, including, but not limited to, triangulation, assisted GPS (AGPS), Enhanced Observed Time Difference (E-OTD), Cell Identifier (CI), Service Area Identifier (SAI), Enhanced Timing Advance (ETA), Base Station Subsystem (BSS), or the like, to further determine the physical location of network computer 300 on the surface of the Earth. It is understood that under different conditions, GPS transceiver 340 can determine a physical location for network computer 300. In one or more embodiments, however, network computer 300 may, through other components, provide other information that may be employed to determine a physical location of the client computer, including for example, a Media Access Control (MAC) address, IP address, and the like.

Memory 304 may include Random Access Memory (RAM), Read-Only Memory (ROM), or other types of memory. Memory 304 illustrates an example of computer-readable storage media (devices) for storage of information such as computer-readable instructions, data structures, program modules or other data. Memory 304 stores a basic input/output system (BIOS) 308 for controlling low-level operation of network computer 300. The memory also stores an operating system 306 for controlling the operation of network computer 300. It will be appreciated that this component may include a general-purpose operating system such as a version of UNIX, or LINUX', or a specialized operating system such as Microsoft Corporation's Windows® operating system, or the Apple Corporation's IOS® operating system. The operating system may include, or interface with a Java virtual machine module that enables control of hardware components or operating system operations via Java application programs. Likewise, other runtime environments may be included.

Memory 304 may further include one or more data storage 310, which can be utilized by network computer 300 to store, among other things, applications 320 or other data. For example, data storage 310 may also be employed to store information that describes various capabilities of network computer 300. The information may then be provided to another device or computer based on any of a variety of methods, including being sent as part of a header during a communication, sent upon request, or the like. Data storage 310 may also be employed to store social networking information including address books, buddy lists, aliases, user profile information, or the like. Data storage 310 may further include program code, data, algorithms, and the like, for use by a processor, such as processor 302 to execute and perform actions such as those actions described below. In one embodiment, one or more portions of data storage 310 might also be stored in another component of network computer 300, including, but not limited to, non-transitory media inside processor-readable removable storage device 336, processor-readable stationary storage device 334, or any other computer-readable storage device within network computer 300, or even external to network computer 300. Data storage 310 may include, for example, meta data 312, application data 314, profile information 316, or the like.

Meta data 312 may include one or more data structures that contain data that can be used to generate application data 314. Application data 314 may include one or more data structures that contain data generated as part of developing a particular application. Profile information 316 may include one or more pieces of information that, with the application data 314, define the particular application.

Applications 320 may include computer executable instructions which, when executed by network computer 300, transmit, receive, or otherwise process messages (e.g., SMS, Multimedia Messaging Service (MMS), Instant Message (IM), email, or other messages), audio, video, and enable telecommunication with another user of another mobile computer. Other examples of application programs include calendars, search programs, email client applications, IM applications, SMS applications, Voice Over Internet Protocol (VOIP) applications, contact managers, task managers, transcoders, database programs, word processing programs, security applications, spreadsheet programs, games, search programs, databases, web services, and so forth. Applications 320 may include one or more of profiler engine 322, import engine 324, or shell engine 326 that perform actions further described below. In one or more of the various embodiments, one or more of the applications 320 may be implemented as modules or components of another application. Further, in one or more of the various embodiments, applications 320 may be implemented as operating system extensions, modules, plugins, or the like.

Furthermore, in one or more of the various embodiments, one or more of network profiler engine 322, import engine 324, or shell engine 326 may be operative in a cloud-based computing environment. In one or more of the various embodiments, one or more of these applications 320, and others, that comprise the management platform may be executing within virtual machines or virtual servers that may be managed in a cloud-based based computing environment. In one or more of the various embodiments, in this context one or more of the applications 320 may flow from one physical network computer within the cloud-based environment to another depending on performance and scaling considerations automatically managed by the cloud computing environment. Likewise, in one or more of the various embodiments, virtual machines or virtual servers dedicated to one or more of profiler engine 322, import engine 324, or shell engine 326 may be provisioned and de-commissioned automatically. Also, in one or more of the various embodiments, one or more of profiler engine 322, import engine 324, shell engine 326, or the like, may be located in virtual servers running in a cloud-based computing environment rather than being tied to one or more specific physical network computers.

Further, network computer 300 may also comprise hardware security module (HSM) 360 for providing additional tamper resistant safeguards for generating, storing or using security/cryptographic information such as keys, digital certificates, passwords, passphrases, two-factor authentication information, or the like. In some embodiments, hardware security module may be employ to support one or more standard public key infrastructures (PKI), and may be employed to generate, manage, or store key pairs, or the like. In some embodiments, HSM 360 may be a stand-alone network computer, in other cases, HSM 360 may be arranged as a hardware card that may be installed in a network computer.

Additionally, in one or more embodiments (not shown in the figures), network computer 300 may include one or more embedded logic hardware devices instead of one or more CPUs, such as an Application Specific Integrated Circuits (ASICs), Field Programmable Gate Arrays (FPGAs), Programmable Array Logics (PALs), or the like, or combination thereof. The one or more embedded logic hardware devices may directly execute embedded logic to perform actions. Also, in one or more embodiments (not shown in the figures), network computer 300 may include one or more hardware microcontrollers instead of one or more CPUs. In one or more embodiments, the one or more microcontrollers may directly execute their own embedded logic to perform actions and access its own internal memory and its own external Input and Output Interfaces (e.g., hardware pins or wireless transceivers) to perform actions as a System On a Chip (SOC), or the like.

Illustrative Logical System Architecture

Figure 4:
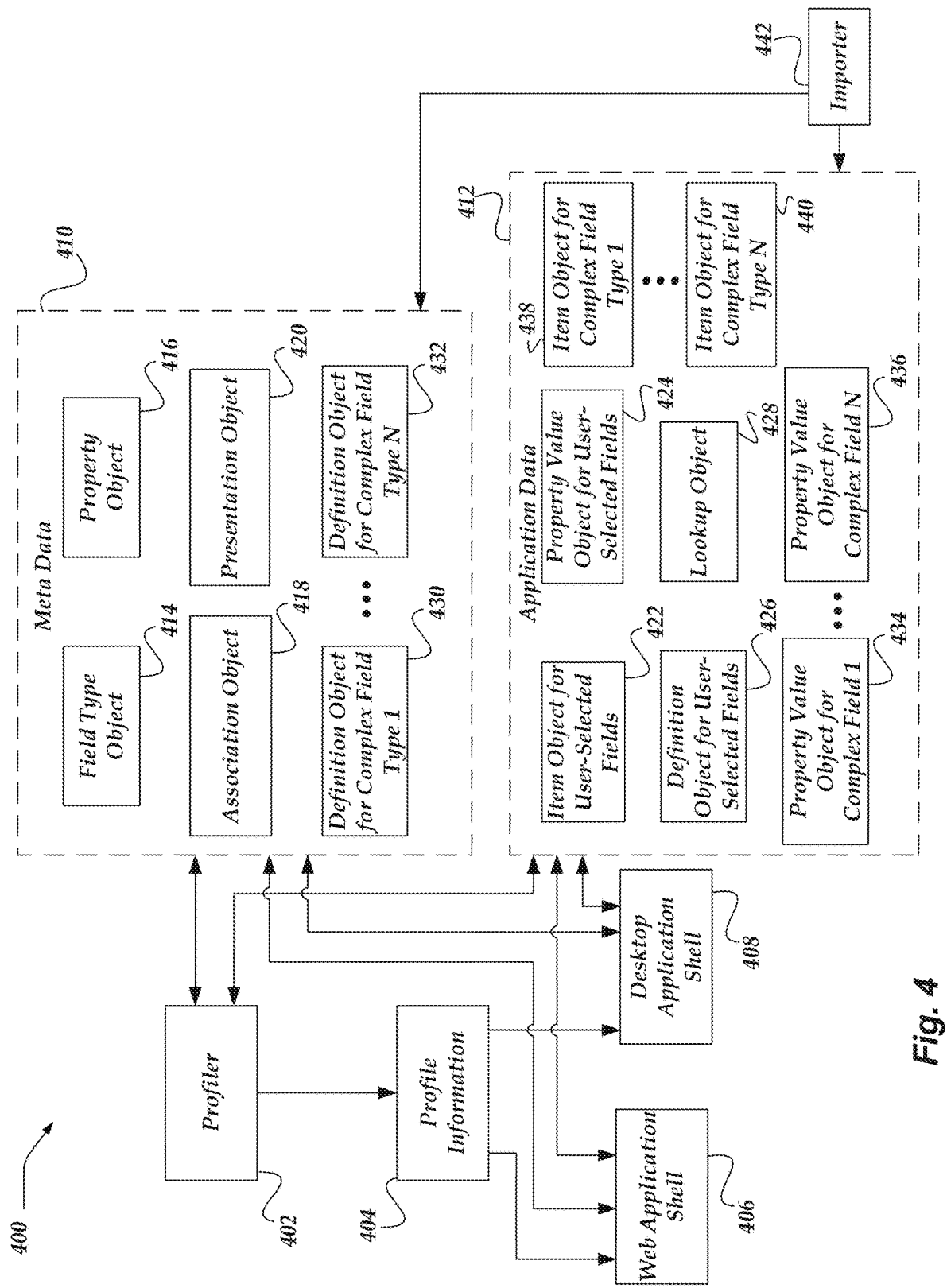
FIG. 4 illustrates a logical architecture of an exemplary platform for rapid application development.

FIG. 4 illustrates a logical architecture of system 400 for rapid application development in accordance with one or more of the various embodiments. developing one or more applications. In one or more of the various embodiments, system 400 may include a profiler, such as profiler 402. For example, profiler 402 may include or be a part of profiler engine 322. In some of the various embodiments, profiler 402 may provide one or more user interfaces that permit a user to design an application, such as one or more of user interface 500, user interface 600, user interface 700, or the like. In some embodiments, based on the application design, profiler 402 may generate information, such as profile information 404. In some embodiments, profile information 404 may include or be a part of profile information 316 in a network computer, such as network computer 300. In one or more of the various embodiments, profiler 402 may provide the generated information in various forms or formats, including, HTML, XML, JSON, binary data, or the like.

In some embodiments, one or more application shells, such as web application shell 406, desk application shell 408, or the like, may employ the generated information, including profile information 404, to provide an application. In some embodiments, the application shell may include or be a part of shell engine 326, client shell engine 222, or the like.

In one or more of the various embodiments, when providing the user interface, profiler 402 may provide an application control palette that presents one or more user-interface control types (e.g., field types, or the like). In this example, profiler 402 may include selectable field types in the application control palette based on one or more data objects included in meta data 410. In some of the various embodiments, meta data 410 may include or be a part of meta data 312 in a network computer, such as network computer 300.

In one or more of the various embodiments, if an application design may be finalized, profiler 402 may generate data for each field in the designed application as one or more data objects included in application data 412. In some embodiments, application data 412 may include or be a part of application data 314 in a network computer, such as network computer 300.

In some embodiments, an application shell may generate the application and the application's user-interface based on profile information 404, meta data 410, or application data 412. In some embodiments, the application shell may access one or more portions of profile information 404, meta data 410, or application data 412 via one or more networks. Alternatively, in some embodiments, one or more portions of profile information 404, meta data 410, or application data 412 may be stored locally to one or more portions of the application shell.

In one or more of the various embodiments, meta data 410 may include one or more data objects, such as field type object 414, property object 416, association object 418, presentation object 420, or the like included in meta data 410. In this example: field type object 414 may represent field types; property object 416 may represent properties for various field types; association object 418 may represent associations between each field type and the various properties; and presentation object 420 may represent how to render or display the properties in an application control palette or an application. In this example, profiler 402 may determine one or more field types to include in an application control palette or an application based on one or more field type objects, such as field type object 414.

In one or more of the various embodiments, application data 412 generated by profiler 402 may include one or more data objects for one or more user-selected fields, such as item object 422, property value object 424, definition object 426, lookup object 428, or the like. In this example, item object 422 may represent each item modeled by the application, property value object 424 may represent one or more property values for one or more properties for each user-selected field, definition object 426 may represent one or more definition values for one or more definitions for each user-selected field, and lookup object 428 may represent information used to populate lookup fields in the application (e.g., drop-down menus, scrollable menus, or the like). In this example, an application shell may determine one or more user-selected fields to include in the application based on one or more portions of the application data for the user-selected fields, such as item object 422.

Also in this example, at run-time, the application shell may determine one or more features (e.g., appearance, function, or the like) of the application fields based on one or more application data objects, such as definition object 426, property value object 424, or the like. In this example, the application shell may populate one or more lookup fields in the application using information provided by one or more lookup objects, such as lookup object 428.

In one or more of the various embodiments, profiler 402 may enable the user to design one or more complex field types based on one or more field types represented by one or more portions of meta data 410. In some embodiments, complex field types may be specialized fields that include one or more other fields of other field types, including other complex fields. In one or more of the various embodiments, complex fields may enable items that otherwise may be represented using multiple fields or field types to be encapsulated into a single complex field type.

In some of the various embodiments, profiler 402 may generate additional meta data for each complex field type designed by the user. In one or more of the various embodiments, one or more definition objects may be provided for each complex field type (e.g., definition object 430 for a first complex field type through definition object 432 for an Nth complex field type, or the like). In some embodiments, each definition object for a complex field type may include one or more definition values.

In one or more of the various embodiments, profiler 402 may enable the user to design an application that includes one or more complex fields. In some of the various embodiments, profiler 402 may generate one or more portions of application data for each complex field included in the application, such as one or more property value objects for each complex field (e.g., property value object 434 for a first complex field through property value object 436 for an Nth complex field, or the like). In some embodiments, profiler 402 may generate one or more portions of application data for each complex field type employed by the application (e.g., complex field item object 438 for a first complex field type through complex field item object 440 for an Nth complex field type, or the like). In this example, each complex field item object for each complex field type may represent one or more items modeled by a particular complex field type. In this example, a profiler, an application shell, or the like (e.g., profiler 402, web application shell 406, desktop application shell 408, or the like) may determine one or more features (e.g., appearance, function, or the like) of one or more complex fields, complex field types, or the like based on one or more portions of meta data, application data, or the like, such as definition objects 430 through 432, property value objects 434 through 436, item objects 438 through 440, or the like.

In one or more of the various embodiments, platform 400 may include an importer, such as importer 442. In some of the various embodiments, importer 442 may import one or more portions of meta data 410, application data 412, or the like from another source. For example, importer 442 may import one or more portions of data that were generated for one or more other applications, thereby enabling the user to use one or more previously designed portions of one or more applications. In some embodiments, importer 442 may be similar to import engine 324.

In one or more of the various embodiments, other combinations of information, data, or data objects may be used to provide similar features. For example, one or more portions of profile information 404, meta data 410, application data 412, data objects therein (e.g., data objects 414-440), or the like may be combined with each other, separated into multiple objects, replaced with one or more alternative objects, or omitted (e.g., by employing inherent or implicit properties, associations, characteristics, functions, rules, or the like). In some of the various embodiments, data objects may be arranged differently, such as using different formats, data structures, objects, or the like.

Figures 5A, 5B:
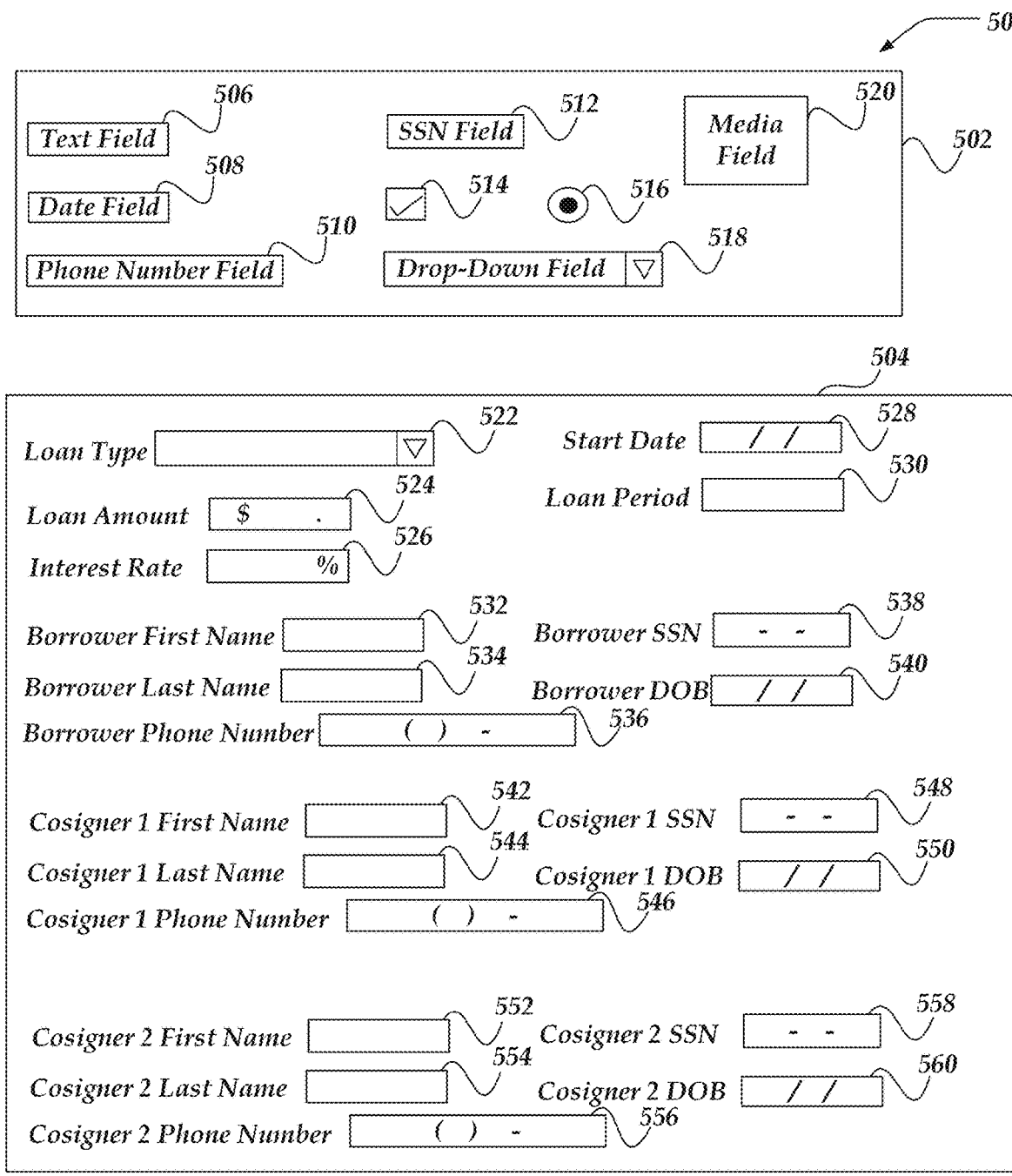
FIG. 5A shows a logical representation of an exemplary user interface that includes palette of application control types and an application design window and that can be employed in conjunction with the platform of FIG. 4.
FIG. 5B illustrates a logical representation of an exemplary simple field selected from the palette of application control types of FIG. 5A and placed in the application design window of FIG. 5A.

FIG. 5A shows a logical representation of exemplary user interface 500 that may include one or more application control palettes 502 that include one or more application control types and one or more application design windows 504. In one or more of the various embodiments, user interface 500 can be used in conjunction with a platform for developing applications, such as platform 400 of FIG. 4. In some of the various embodiments, one or more portions of application control palette 502 or application design window 504 may be in different graphic user-interface windows, web pages, or the like. In some embodiments, one or more portions of application control palette 502 may be included in application design window 504.

In one or more of the various embodiments, application control palette 502 may include field types such as, for example, text field type 506, date field type 508, phone number field type 510, social security number field type 512, checkbox field type 514, radio button field type 516, drop-down menu field type 518, media field type 520 (e.g., a field that may receive or provide one or more pictures, motion pictures, graphics, animations, audio clips, or the like), scrollable list field type (not shown), or the like. In one or more of the various embodiments, these field types may be considered simple field types because fields of these field types do not contain other fields. One of ordinary skill in the art will appreciate that there may be more or fewer simple field types than those illustrated in FIG. 5A. In the interest of brevity and clarity some field types may have been omitted. However, the field types disclosed herein are sufficient to disclose these innovations to one of ordinary skill in the art.

In some of the various embodiments, a user may develop an application by selecting one or more simple field types from application control palette 502 by placing or arranging (e.g., via drag-and-drop or the like) simple fields generated therefrom in application design window 504. In some embodiments, the user may be enabled to place the fields where they should appear when the application executes. Alternatively, in some embodiments, the fields may be arranged to snap to a particular location or layout pattern in the application. In the example illustrated in FIG. 5A, application design window 504 contains simple fields 522-560 that have been selected from application control palette 502, placed in application design window 504, and arranged to develop a loan tracking application.

FIG. 5B shows a logical representation of exemplary simple field 562 selected from application control palette 502 and placed in application design window 504. In one or more of the various embodiments, simple field 560 may represent one or more of simple fields 522-560. In some of the various embodiments, simple field 562 may inherit one or more properties, definitions, or the like, depending on the field type. In some embodiments, the user may be enabled to define, edit, or otherwise modify values of the one or more properties or definitions of a simple field, such as simple field 562 to change its function or appearance. Accordingly, in some embodiments, properties or definitions may represent various features of a field, such as label, tool-tip, help file, height, width, style, color, border, position, z-order, read-only, case sensitivity, or the like. For example, the user may specify one or more values for value field 564, label 566, height 568, width 570, or the like.

In the example shown in FIG. 5A, each of simple fields 522-560 has a label that has been modified based on its purpose. For example, drop-down field 522 has a label of "Loan Type" because it contains one or more selectable loan types. The label values of simple fields 524-530 indicate values related to a loan instance. In the example illustrated of FIG. 5A, application design window 504 also contains simple fields 532-560, that have been individually placed or arranged. Accordingly, in some embodiments, each field may have one or more individually modified definition or property values. For example, simple fields 532-540 represent a borrower while simple fields 542-550 represent a first cosigner and simple fields 552-560 represent a second cosigner for a given loan. In some embodiments, selecting another loan type from simple field 522 may cause the loan tracking application to show another set of fields.

Figure 6:
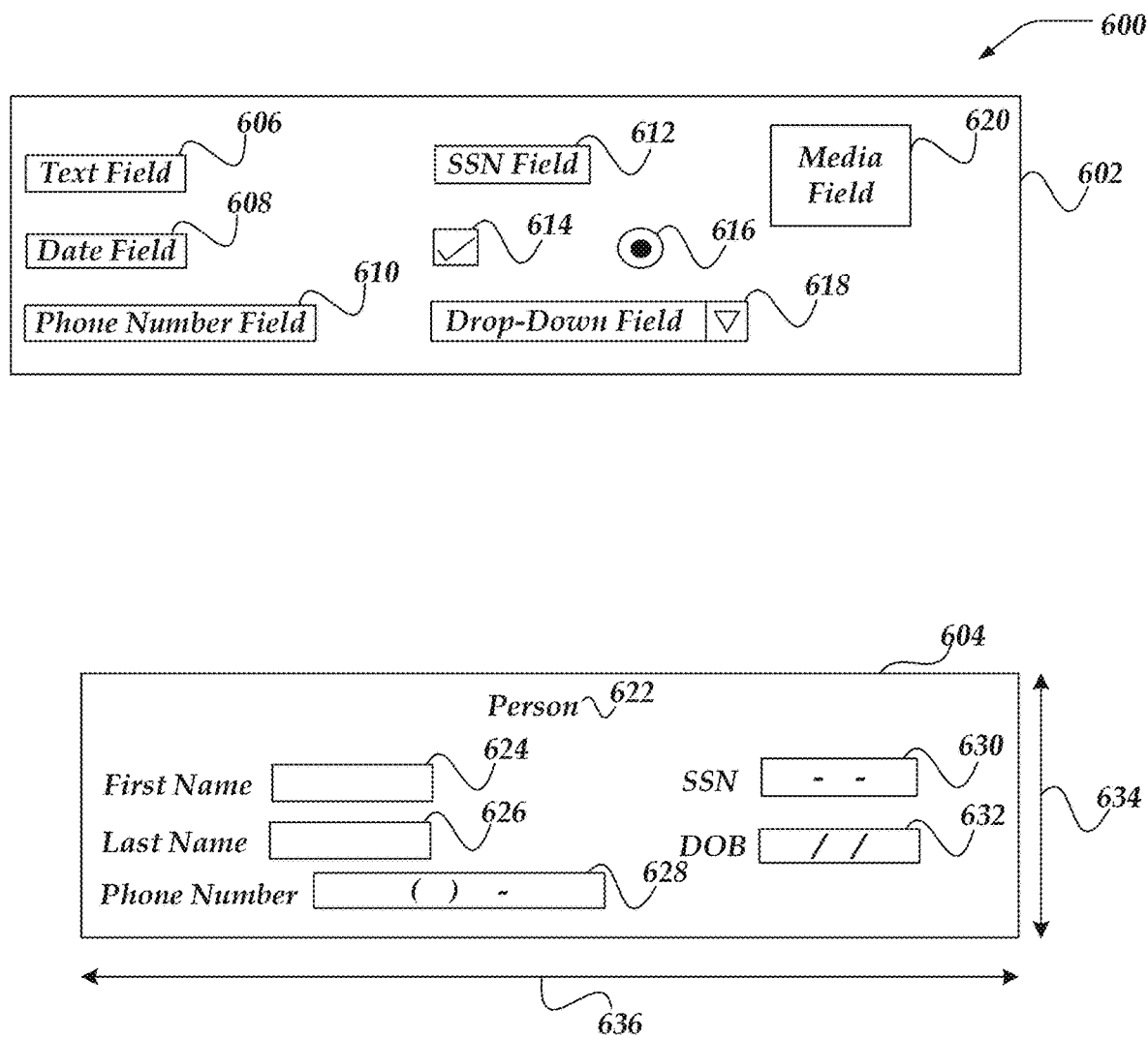
FIG. 6 shows a logical representation of an exemplary user interface that includes a palette of application control types and a complex field type design window and that can be employed in conjunction with the platform of FIG. 4.

FIG. 6 shows a logical representation of exemplary user interface 600 that includes one or more application control palette 602 and one or more complex field type design windows 604. In one or more of the various embodiments, user interface 600 can be used in conjunction with a platform for developing applications, such as platform 400 of FIG. 4. In some of the various embodiments, application control palette 602 may be the same as or similar to application control palette 502 of FIG. 5A. In this example, application control palette 602 includes one or more simple field types, such as simple field types 606-620. In some of the various embodiments, one or more portions of complex field type design window 604 and application design window 504 of FIG. 5A may be in different windows, user interfaces, or the like. In some embodiments, one or more portions of complex field type design window 604 may be included in application design window 504 of FIG. 5A. In some embodiments, the user may place, arrange, or modify fields in complex field type design window 604 in the same or similar manner as in application design window 504 of FIG. 5A.

In one or more of the various embodiments, complex field type design window 604 may be employed to generate one or more complex field types comprised of two or more simple fields or complex fields. For example, a complex field type may be arranged to represent a class of items that use more than one simple field. In some of the various embodiments, each complex field type may be arranged to include one or more complex field labels, such as complex field label 622 to label the complex field generated from the complex field type when it is used in an application. In the example illustrated in FIG. 6, the complex field type represents a person having a first name, last name, social security number, date-of-birth (DOB), and phone number represented using simple fields 624-632.

In one or more of the various embodiments, similar to simple field 562 of FIG. 5B, a complex field type generated by complex field type design window 604 may have one or more properties or definitions. In some embodiments, the user may be enabled to define, edit, or otherwise modify values of the one or more properties or definitions of complex field types and the complex fields generated therefrom, such as labels, tool-tips, height, width, style, color, border, position, z-order, or the like, to change the function or appearance of the complex field types or the complex fields generated therefrom. For example, the user may specify one or more values for height 634, width 636, or the like. As another example, the user may specify that, one or more of simple fields 624-632 or one or more combinations of simple fields 624-632 may be designated as required inputs, read-only, or the like.

In one or more of the various embodiments, when one or more complex field types are generated using complex field type design windows, such as complex field type design window 604, the one or more complex field types may be added to an application control palette, such as application control palette 602 and made available to use in designing applications. Also, in one or more of the various embodiments, one or more complex fields may be included in one or more other complex field types.

Figure 7:
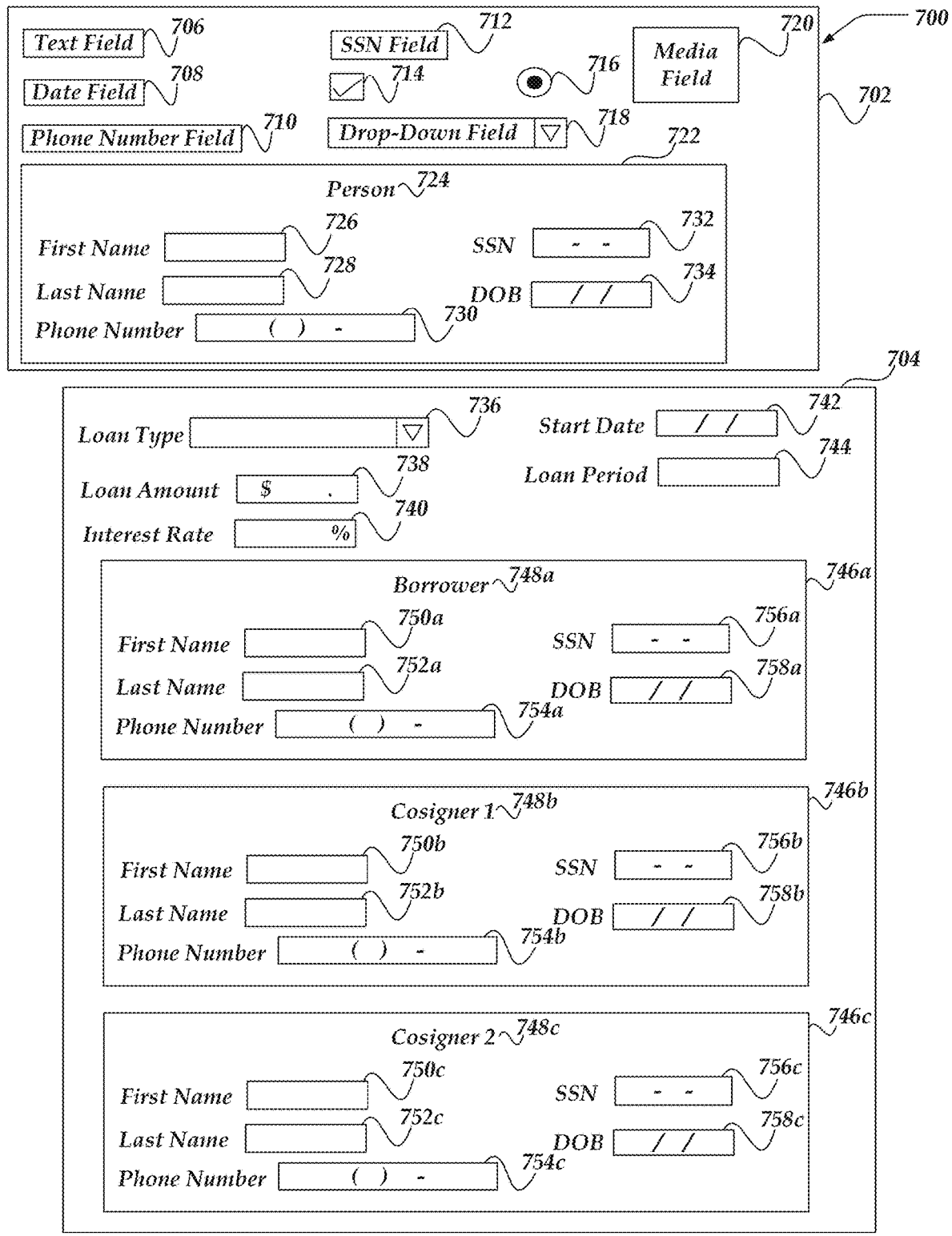
FIG. 7 illustrates a logical representation of an exemplary user interface that includes a palette of application control types and an application design window and that can be employed in conjunction with the platform of FIG. 4.

FIG. 7 illustrates a logical representation of exemplary user interface 700 that includes one or more application control palettes 702 and one or more application design windows 704. In one or more of the various embodiments, user interface 700 can be used in conjunction with a platform for developing applications, such as platform 400 of FIG. 4. In some of the various embodiments, application control palette 702 may be similar to application control palette 602 of FIG. 6. In this example, application control palette 702 includes one or more simple field types, such as simple field types 706-720. Also in this example, application control palette 702 includes one or more complex field types, such as complex field type 722. For example, complex field type 722 may have been generated via complex field type design window 604 of FIG. 6. In some embodiments, the user may place, arrange, or modify fields in application design window 704 in the same or similar manner as in application design window 504 of FIG. 5A.

In the example illustrated in FIG. 7, application design window 704 includes simple fields 736-744 and complex fields 746a-746c that have been selected from application control palette 702 and placed, arranged, or modified in the application design window 704. In this example, simple fields 736-744 represent a loan. Also in this example, complex fields 746a-746c may be instances of complex field type 722. Complex fields 746a-746c have complex field labels 748a-748c that each describe the type of person represented by each complex field. For example, complex field 746a represents a borrower (defined by values in simple fields 750a-758a) while complex field 746b represents a first cosigner (defined by values in simple fields 750b-758b) and complex field 746c represents a second cosigner (defined by values in simple fields 750c-758c), borrower, first cosigner, and second cosigner each being a type of person.

In one or more of the various embodiments, providing complex fields may increase speed of application development or modification by reducing a number of individual simple fields that need to be placed, arranged, or modified. For example, any placement, arrangement, or modification made to any simple field in the complex field type design window 604 of FIG. 6 may be automatically inherited by each corresponding complex field type in the palette window 702 or each instance of complex field type 722 that may be used in an application.

Figure 8:
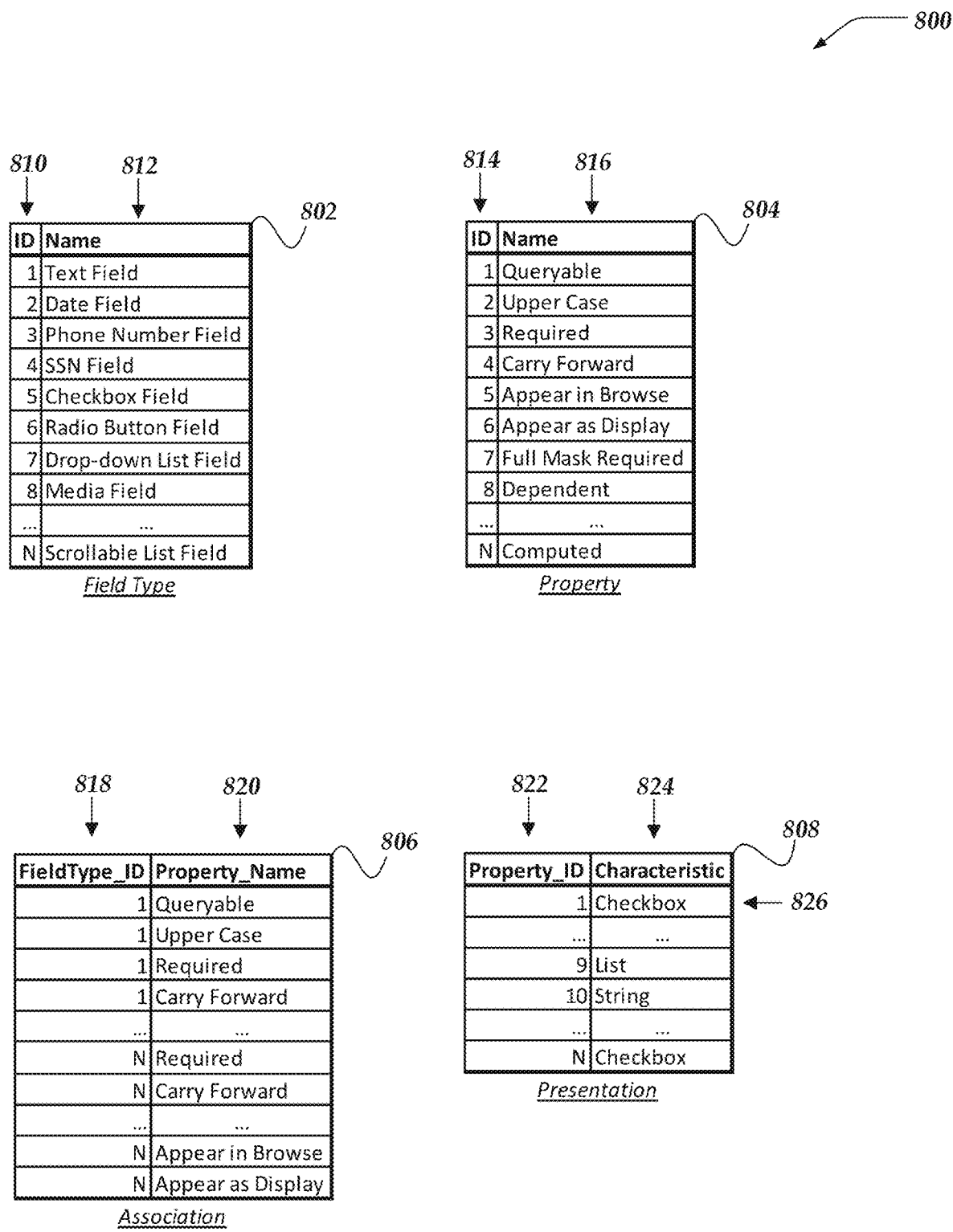
FIG. 8 shows a logical representation of a portion of an exemplary data model that can be provided to the platform of FIG. 4.

FIG. 8 shows a logical schematic of a portion of exemplary data model 800 that can be provided to a platform for developing one or more applications, such as platform 400 of FIG. 4. In one or more of the various embodiments, data model 800 may correspond to one or more portions of meta data, such as meta data 410 of FIG. 4, that may be employed by a profiler, or the like, to generate user interfaces for applications, such as user interface 500.

In some of the various embodiments, data model 800 may include one or more data objects that may represent the meta data, including field type object 802, property object 804, association object 806, presentation object 808, or the like. In this example, as shown in FIG. 8, field type object 802 may represent field types included in an application control palette (e.g., application control palette 502 or the like), property object 804 may represent properties that may be associated with one or more field types, association object 806 may represent associations between the properties and various field types, and presentation object 808 may represent how properties should be presented to a user.

In this example, each data object has a number of named attributes. For example, field type object 802 includes attributes, such as ID 810 and Type 812. Property object 804 includes attributes, such as ID 814 and Type 816. Association object 806 includes attributes, such as FieldType_ID 818 and Property_Name 820. And, presentation object 808 includes attributes, such as Property_ID 822 and Characteristic 824. For each of these example data objects, the values for identifiers, such as those shown as entries for attribute 810, or the like, may be sequential numbers, non-sequential numbers, strings, or the like.

In one or more of the various embodiments, a profiler, such as profiler 402, may determine one or more field types to include in an application control palette, such as application control palette 502, based on one or more records in one or more data objects, such as field type object 802. For example, each record in a data object, such as field type object 802, may correspond to a field type, such as one of simple field types 506-520 in application control palette 502. In some of the various embodiments, for a user-selected field of a given one of the field types, the profiler may enable a user to enter, adjust, or otherwise modify one or more property values of various properties associated with the given field type based on one or more records in one or more data objects, such as property object 804, association object 806, presentation object 808, or the like. In this example, each record in a data object, such as property object 804, may correspond to one or more properties that may be associated with one or more of the field types. In this example, each record in a data object, such as association object 806, may associate one or more properties with one or more of the field types (e.g., via one-to-one mapping, classification, or the like). In this example, each record in a data object, such as presentation object 808, may indicate a presentation characteristic of one or more of the properties. For example, record 826 indicates that the value of the property having ID=1 should be displayed using a checkbox control if presented to a user.

In some of the various embodiments, other combinations of data objects may be used to provide similar features. For example, one or more of data objects 802-808 may be combined with another data object, separated into multiple data objects, replaced with one or more alternative data objects, or omitted (e.g., by employing inherent or implicit properties, associations, characteristics, or the like). For clarity, data objects 802-808 are represented using a tabular format. In some of the various embodiments, data sets or data objects may be arranged differently, such as using different formats, data structures, objects, or the like.

Figure 9:
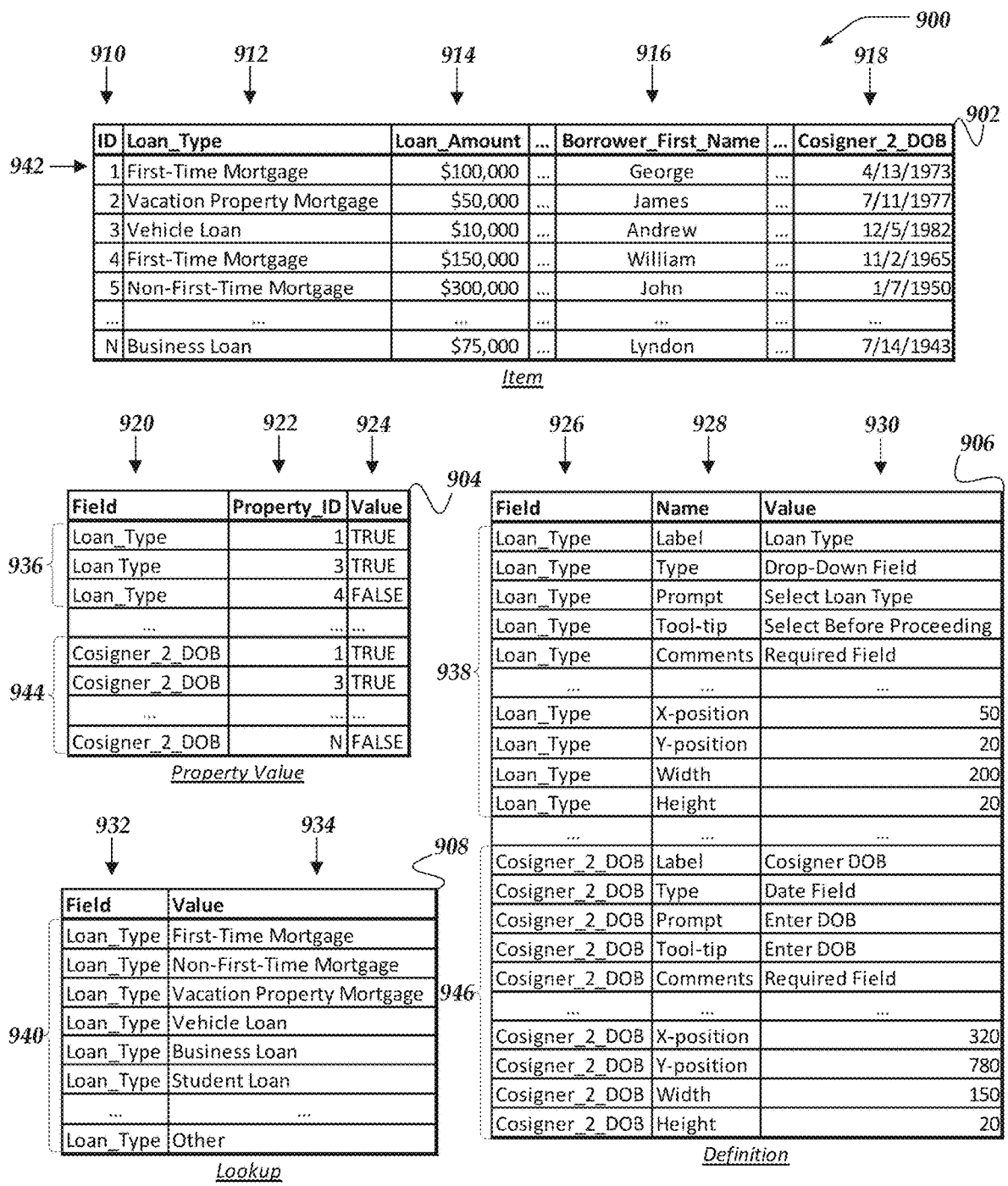
FIG. 9 illustrates a logical representation of a portion of an exemplary data model that can be provided to the platform of FIG. 4.

FIG. 9 illustrates a logical schematic of a portion of exemplary data model 900 that can be provided to a platform for developing one or more applications, such as platform 400 of FIG. 4. In one or more of the various embodiments, data model 900 may correspond to one or more portions of application data, such as application data 412 of FIG. 4, that may be employed by an application shell, such as web application shell 406 or desktop application shell 408, or the like, to generate user interfaces for applications, such as those developed via user interface 500.

In one or more of the various embodiments, data model 900 may include one or more data objects that may represent the application data, such as item object 902, property value object 904, definition object 906, lookup object 908, or the like. In this example, as shown in FIG. 9, item object 902 may represent items (e.g., items modeled by the application, such as loans, inventory, evidence, cases, personnel, or the like), property value object 904 may represent property values of fields in the application, definition object 906 may represent definitions of fields in the application, and lookup object 908 may represent information used to populate lookup fields in the application.

In this example, each data object has a number of named attributes. For example, a data object, such as item object 902, may be arranged to include attributes, such as attributes 910-918, where one or more of the attributes, such as attribute 910, may represent an item identifier (e.g., a loan identifier or the like) and one or more other attributes, such as attributes 912-918, may represent other values associated with modeled items (e.g., loans or the like), such as values corresponding to fields in the application, such as simple fields 522-560. In this example, property value object 904 may include one or more attributes, such as Field 920, Property_ID 922, Value 924, or the like. In this example, definition object 906 includes attributes, such as Field 926, Name 928, and Value 930. In this example, lookup object 908 includes attributes, such as Field 932 and Value 934. For each of these example data objects, the values for identifiers, such as those shown as entries for attribute 910, or the like, may be sequential numbers, non-sequential numbers, strings, or the like, that may be used for uniquely identifying object records in an application.

In this example, each record in one or more data objects, such as item object 902, may correspond to one of the items modeled by the application. In this example, the application may be modeling loans using simple fields 522-560. Accordingly, each record in item object 902 may correspond to a loan. In this example, each record in a data object, such as property value object 904, may correspond to a property value for a property of a field in the application, such as a given one of simple fields 522-560. In this example, each record in a data object, such as definition object 906, may correspond to a definition value for a definition of a field in the application, such as a given one of simple fields 522-560. In this example, each record in a data object, such as lookup object 908 may correspond to a lookup value for a drop-down list, scrollable list, or the like, used in the application such as simple field 522.

In one or more of the various embodiments, an application shell, such as desktop application shell 408, web application shell 406, or the like, may determine one or more fields to include in the application based on attributes in one or more data objects included in a data model that may be associated with the application. For example, attribute 912 of item object 902 may correspond to field 522. In some of the various embodiments, the application shell may determine features (e.g., function, appearance, or the like) of the fields to include in the application based on various records in one or more data objects included in a data model that may be associated with the application. In this example, the application shell may employ records 936 in property value object 904 to determine various property values for field 522. Also in this example, the application shell may employ records 938 in definition object 906 to determine various definition values for field 522. Accordingly, the various property or definition values stored in property value object 904 and definition value object 906 may represent various features of field 522 such as label, tool-tip, help file, height, width, style, color, border, position, z-order, read-only, case sensitivity, or the like.

In one or more of the various embodiments, the application shell may determine one or more values to include in a given field based on its associated field type (e.g., drop-down lists, scrollable lists, or the like) and various records in one or more data objects. For example, the application shell may employ records 940 in lookup object 908 to populate field 522 with user-selectable values.

In one or more of the various embodiments, one or more values in various records in one or more data objects may be provided (e.g., to a user, by the user, or the like) via various fields included in the application. For example, the values included in a record in a data object, such as record 942 in item object 902, may represent a loan, such as a first-time mortgage. Accordingly, in this example, a user may employ the application to view, enter, or retrieve values for a particular loan, such as loan type, loan amount, interest rate, start date, loan period, borrower's first name, borrower's last name, borrower's phone number, borrower's social security number, borrower's date of birth, first cosigner's first name, first cosigner's last name, first cosigner's phone number, first cosigner's social security number, first cosigner's date of birth, second cosigner's first name, second cosigner's last name, second cosigner's phone number, second cosigner's social security number, second cosigner's date of birth, or the like. In contrast, in some embodiments, data objects for other data models representing different applications may have different fields. For example, an item object for a police evidence inventory application (not shown) may include fields, such as fields associated with values for one or more of evidence item identifier, case number, evidence type, quantity, owner, location of discovery, discovering officer, chain of custody, storage location, expiration date, event to occur upon expiration date, or the like. As another example, an item object for a case tracking application (not shown) may include fields, such as fields associated with values for one or more of case number, offense type, occurrence date, occurrence location, responding officer, suspect, victim, witness, associated evidence items, or the like.

In some of the various embodiments, other combinations of data objects may be used to provide a data model for various applications. For example, one or more of data objects 902-908 may be combined with another data object, separated into multiple data objects, replaced with one or more alternative data objects, or omitted (e.g., by employing inherent or implicit property values, definition values, lookup values, or the like). For clarity, data objects 902-908 are represented using a tabular format. In some of the various embodiments, data model or data objects may be arranged differently, such as using different formats, data structures, objects, or the like.

Figure 10:
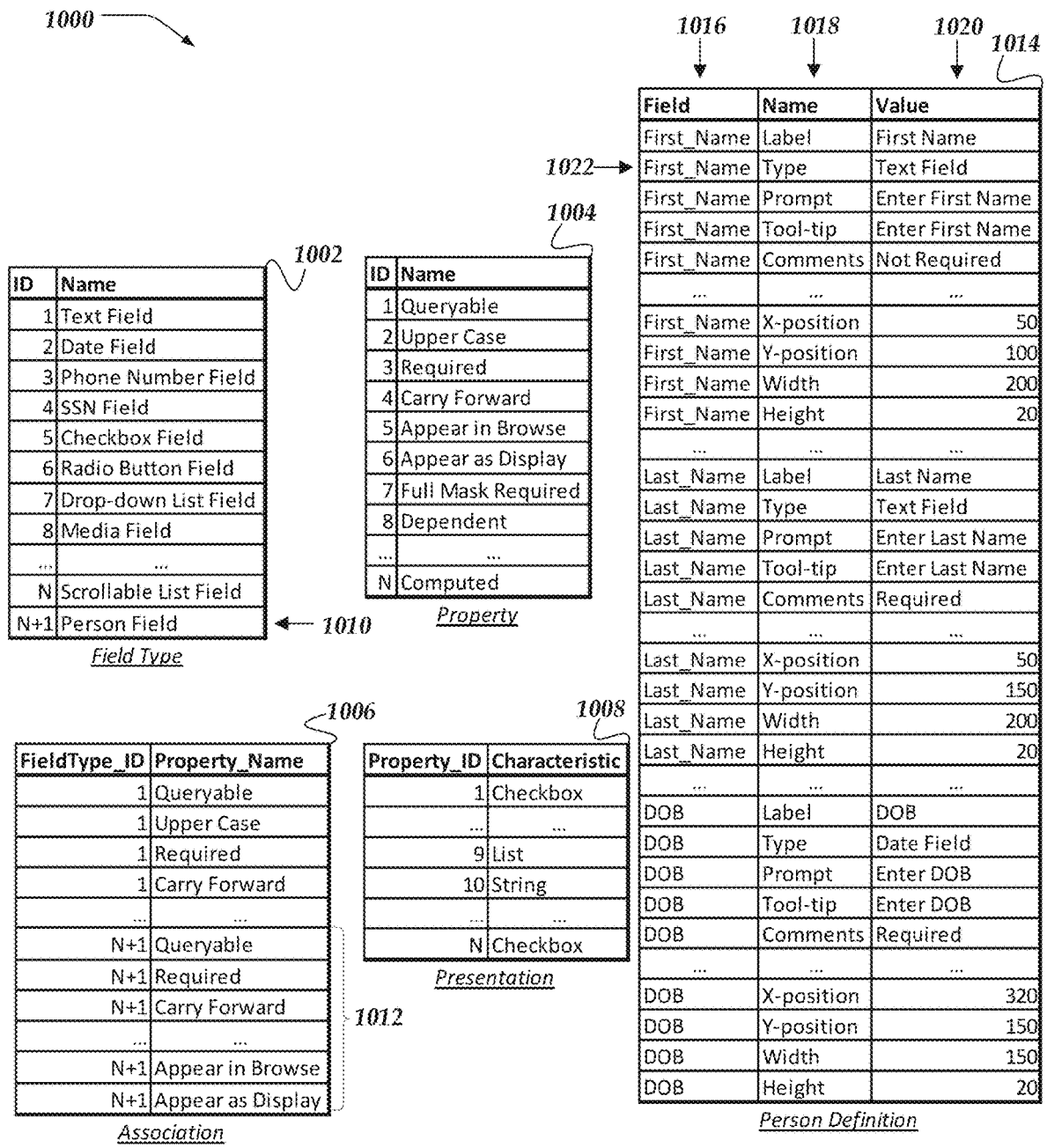
FIG. 10 shows a logical representation of a portion of an exemplary data model that can be provided to the platform of FIG. 4.

FIG. 10 shows a logical schematic of a portion of exemplary data model 1000 that can be provided to a platform for developing one or more applications that may include one or more complex fields, such as platform 400. In one or more of the various embodiments, data model 1000 may correspond to one or more portions of meta data, such as meta data 410, that may be employed by a profiler, or the like, to generate user interfaces for applications, such as user interface 700.

Similar to data model 800 in FIG. 8, in one or more of the various embodiments, data model 1000 may include one or more data objects, including field type object 1002, property object 1004, association object 1006, presentation object 1008, or the like, that may be similar to field type object 802, property object 804, association object 806, presentation object 808, or the like. For example, in some of the various embodiments, the profiler may determine which field types to include in an application control palette, such as application control palette 702, based one or more records, such as record 1010 in field type object 1002. As another example, for a user-selected field of a given field type, the profiler may enable a user to enter, adjust, or otherwise modify one or more property values of various properties associated with the given field type based on one or more records, such as records 1012 in association object 1006 that associate the complex field type represented by record 1010 in field type object 1002 with various properties in various records in property object 1004.

In one or more of the various embodiments, data model 1000 may also include one or more data objects, such as person definition object 1014, that represent various definitions of one or more complex field types comprised of one or more field types.

In some of the various embodiments, one or more data objects, such as field type object 1002, may be arranged to include simple field types as well as references to one or more complex field types that may be included in the data model. Alternatively, in some embodiments, the profiler may identify one or more available complex fields directly from the data model rather than identifying them using a field type object. For example, the profiler may be arranged to traverse a data model to identify one or more complex fields and automatically include them in the application control palette.

In this example, each data object has a number of named attributes. For example, person definition object 1014 includes attributes, such as Field 1016, Name 1018, Value 1020, or the like. For each of these data objects, the values for identifiers, such as those shown as entries for attribute 1016, attribute 1018, or the like, may be numbers, strings, or the like.

In one or more of the various embodiments, the data model 1000 may include a separate data object, such as person definition object 1014, for each complex field type (e.g., each complex field type included in an application control palette, such as application control palette 702). In this example, each record in a complex field definition object, such as person definition object 1014, may correspond to a field included in a complex field type, such as complex field type 722. In this example, each record in a complex field definition object, such as person definition object 1014, may represent a property value or definition value for a corresponding field included in the complex field type.

In some embodiments, various portions of multiple complex field types may be defined using a single complex field definition object arranged in various ways to include information for distinguishing between different complex field types. For example, in one or more of the various embodiments, a complex field definition object may be arranged to include a separate attribute that indicates a particular complex field type (e.g., person, address, or the like). Likewise, in other embodiments, field name values (e.g., attribute 1016) may be appended with identifiers that correspond to particular complex field types.

In one or more of the various embodiments, the profiler may determine which fields to include in each complex field type based on records in an associated complex field definition object, such as person definition object 1014. Likewise, in some of the various embodiments, the profiler may determine features (e.g., function, appearance, or the like) of the fields included in the complex field type based on records in the associated complex field definition object. Accordingly, the various property values or definition values in a complex field definition object such person object 1014 may represent various features of each field included in the complex field type such as label, tool-tip, help file, height, width, style, color, border, position, z-order, read-only, case sensitivity, or the like.

In some embodiments, the profiler may determine one or more values to include in a field included in the complex field type based on the field type (e.g., drop-down lists, scrollable lists, or the like) and various records in one or more data objects, such as person definition object 1014. For example, the profiler may employ records in person definition object 1014 to populate the field with user-selectable values. Also, for example, record 1022 indicates that the complex field type defined by person definition object 1014 includes a text field that is identified as First Name.

In some of the various embodiments, other combinations of data objects may be used to provide similar features. For example, one or more of data objects 1002-1008 and 1014 may be combined with another data object, separated into multiple data objects, replaced with one or more alternative data objects, or omitted (e.g., by employing inherent or implicit properties, associations, characteristics, or the like). For clarity, data objects 1002-1008 and 1014 are represented using a tabular format. In some of the various embodiments, data sets or data objects may be arranged differently, such as using different formats, data structures, objects, or the like.

Figure 11:
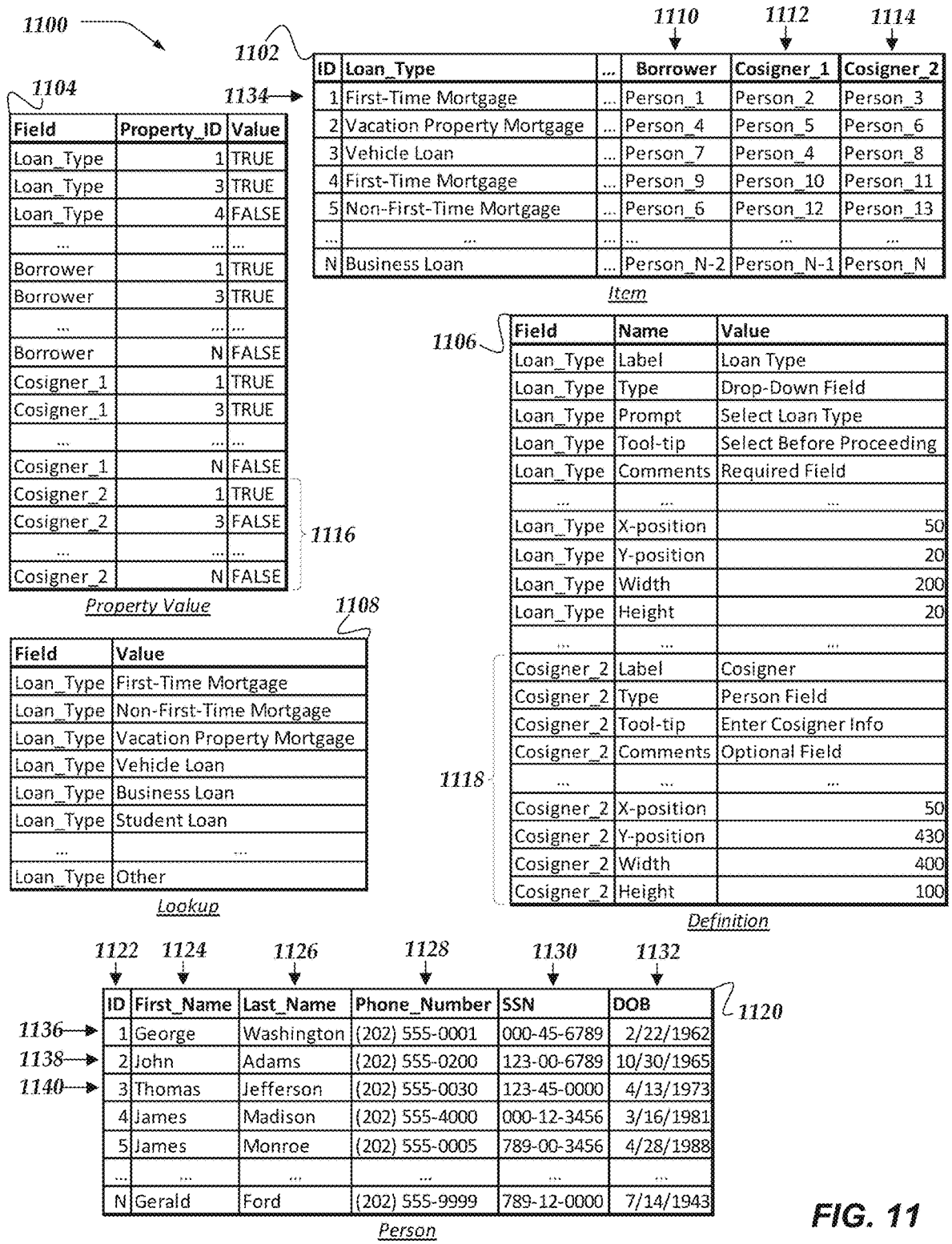
FIG. 11 illustrates a logical representation of a portion of an exemplary data model that can be provided to the platform of FIG. 4.

FIG. 11 illustrates a logical schematic of a portion of exemplary data model 1100 that can be provided to a platform for developing one or more applications, such as platform 400. In one or more of the various embodiments, data model 1100 may correspond to one or more portions of application data, such as application data 412, that may be employed by an application shell, such as web application shell 406 or desktop application shell 408, or the like, to generate user interfaces for applications, such as those developed via user interface 700.

Similar to data model 900, in one or more of the various embodiments, data model 1100 may include one or more data objects, including item object 1102, property value object 1104, definition object 1106, lookup object 1108, or the like, that may be similar to item object 902, property value object 904, definition object 906, lookup object 908, or the like. For example, in some of the various embodiments, the application shell may determine one or more fields to include in the application based on attributes in one or more item objects. In this example, attribute 1110 of item object 1102 may correspond to complex field 746a, attribute 1112 may correspond to complex field 746b, and attribute 1114 may correspond to complex field 746c. In contrast, in some embodiments, if simple fields, such as simple fields 552-560, were employed in place of a complex field, such as complex field 746c, an item object, such as item object 902, may include one or more attributes, such as attribute 918, for each of these simple fields.

In this example, the application shell may employ records in one or more property value objects, such as records 1116 in property value object 1104, to determine various property values for one or more complex fields included in the application, such as complex field 746c. Also, in this example, the application shell may employ records in one or more definition objects, such as records 1118 in definition object 1106, to determine various definition values for one or more complex fields included in the application, such as complex field 746c.

In one or more of the various embodiments, using complex fields rather just simple fields reduces the complexity of the application data by reducing the number of records in the application's property value object, definition value object, or the like. For example, using a complex field that includes ten simple fields may eliminate the need to define the properties and definitions of the ten simple fields separately.

For example, in some embodiments, if simple fields, such as simple fields 552-560, were employed instead of a complex field, such as complex field 746c, a property value object, such as property value object 904, may include one or more records, such as records 944, for each of simple fields 552-560. Likewise, a definition object, such as definition object 906, may include one or more records, such as records 946, for each of simple fields 552-560. In contrast, using a complex field, such as complex field 746c just requires data model 1100 to include property values and definition values for the complex field.

In one or more of the various embodiments, data model 1100 may also include one or more complex field item objects for each complex field type employed in the application, such as person object 1120. Accordingly, each complex field item object may represent a complex field item associated with one or more items modeled by the application. In this example, person object 1120 represents persons associated with loans modeled by the application.

In this example, each data object has a number of named attributes. For example, a complex field item object, such as person object 1120, may be arranged to include attributes, such as attributes 1122-1132. In this example, one or more of the attributes in the complex field item object, such as attribute 1122, may represent a complex field item identifier (e.g., a person identifier or the like). Also in this example, one or more other attributes in the complex field item object, such as attributes 1124-1132, may represent values corresponding to fields included in one or more complex fields in the application, such as fields 750a-750c, fields 752a-752c, fields 754a-754c, fields 756a-756c, and fields 758a-758c of complex fields 746a-746c. For each of these example data objects, the values for identifiers, such as those shown as entries for attribute 1122, or the like, may be sequential numbers, non-sequential numbers, strings, or the like, that may be used for uniquely identifying object records in an application.

In one or more of the various embodiments, an application shell, such as desktop application shell 408, web application shell 406, or the like, may determine which fields to include in each complex field in the application based on attributes in one or more complex field item objects. For example, attribute 1124 of person object 1120 may correspond to fields 750a-750c, attribute 1126 may correspond to fields 752a-752c, and attribute 1128 may correspond to fields 754a-754c.

In this example, each record in one or more item objects, such as item object 1102, may correspond to an item modeled by the application. In this example, the application may be modeling loans using simple fields 736-744 and complex fields 746a-746c. Accordingly, the values included in a record in an item object, such as record 1134 in item object 1102, may represent an item, such as a loan (e.g., a first-time mortgage, vehicle loan, or the like).

In one or more of the various embodiments, various attributes in one or more item objects, such as attributes 1110-1114 in item object 1102, may include values that represent various complex field items (e.g., by identifying various records in one or more complex field item objects, such as records 1136-1140 in person object 1120).

In this example, each record in one or more complex field item objects may correspond to a complex field item modeled by one or more complex fields in the application. In this example, complex fields 746a-746c may be modeling persons. Accordingly, in this example, person object 1120 includes records 1136-1140 that may represent persons (e.g., George Washington, John Adams, Thomas Jefferson, or the like).

In one or more of the various embodiments, values for identifiers such as those shown as entries for attributes 1110-1114 may be used for referencing particular complex field items. In some embodiments, identifier values may be sequential numbers, non-sequential numbers, strings, or the like. In this example, the identifier values are constructed by combining the name of the complex field type and a number. In other embodiments, identifier values may be arranged differently. Accordingly, in this example, item record 1134 shows that person object record 1136 represents a borrower, person object record 1138 represents a first co-signer, and person object record 1140 represents a second co-signer.

In some of the various embodiments, other combinations of data objects may be used to provide a data model for applications. For example, one or more of data objects 902-908 may be combined with another data object, separated into multiple data objects, replaced with one or more alternative data objects, or omitted (e.g., by employing inherent or implicit property values, definition values, lookup values, or the like). For clarity, data objects 902-908 are represented using a tabular format. In some of the various embodiments, data model or data objects may be arranged differently, such as using different formats, data structures, objects, or the like.

Generalized Operations

FIGS. 12-15 represent generalized operations for designing, building, or otherwise providing one or more applications via a platform, such as platform 400. In one or more of the various embodiments, processes 1200, 1300, 1400, and 1500 described in conjunction with FIGS. 12-15 may be implemented by or executed by one or more processors in a single network computer, such as network computer 300. In some of the various embodiments, these processes, or portions thereof, may be implemented by or executed in a plurality of network computers. In other embodiments, these processes, or portions thereof, may be implemented by or executed in a single client computer, such as client computer 200. In some embodiments, these processes, or portions thereof, may be implemented by or executed in a plurality of client computers. In some embodiments, these processes, or portions thereof, may be implemented by or executed in one or more virtualized computers, such as those in a cloud-based environment. However, embodiments are not so limited, and various combinations of network computers, client computers, or the like may be utilized. In some embodiments, some or all of the actions performed by processes 1200, 1300, 1400, and 1500 may be executed in whole or in part by one or more of profiler engine 322, import engine 324, shell engine 326, client shell engine 222, or the like executed by one or more processors of one or more client or network computers.

Figure 12:
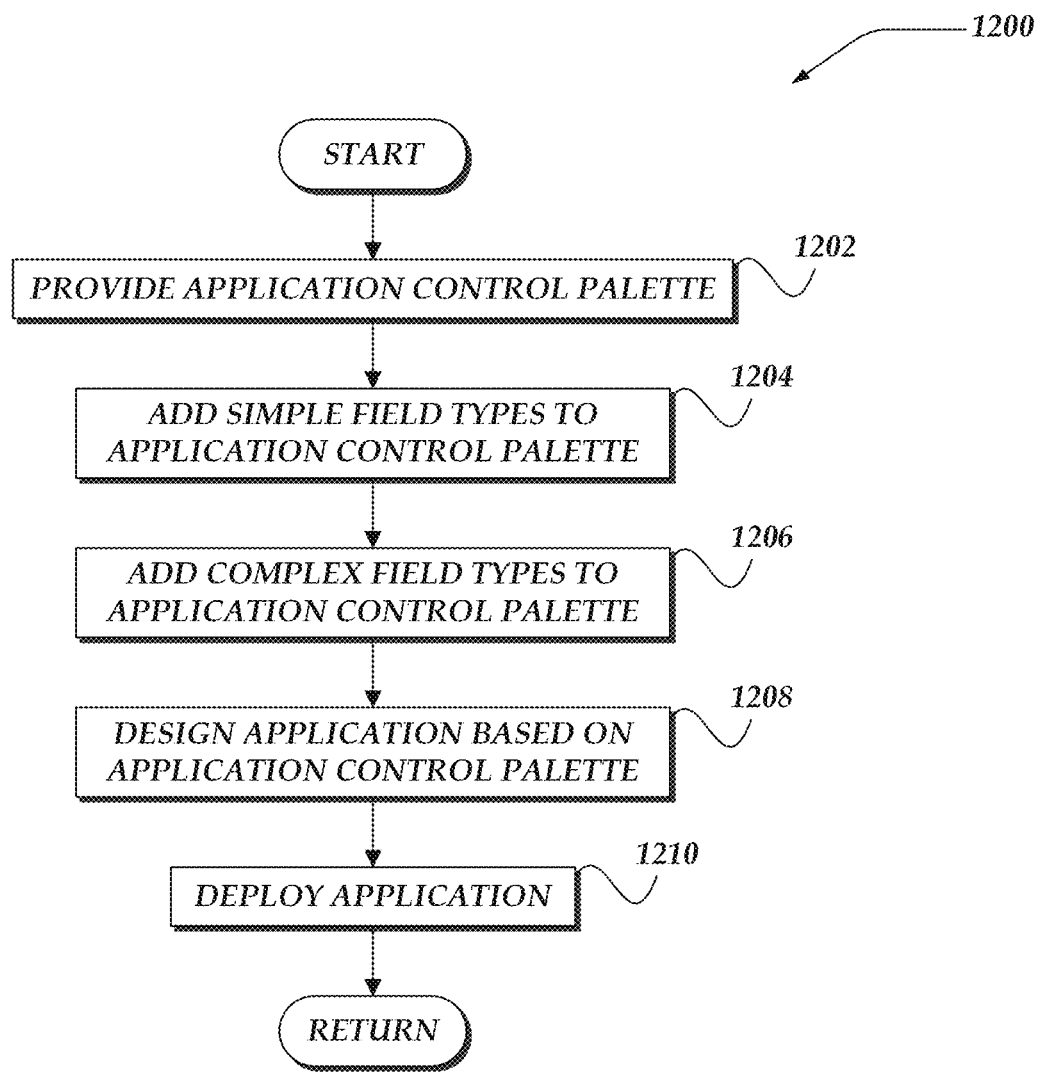
FIG. 12 shows an overview flowchart of an exemplary process for rapid application development via a platform, such as the platform of FIG. 4.

FIG. 12 shows an overview flowchart of an exemplary process for rapid application development via one or more platforms, such as platform 400. After a start block, at block 1202, in one or more of the various embodiments, a profiler (e.g., profiler 400) may be arranged to provide one or more application control palettes, such as application control palette 502, application control palette 602, application control palette 702, or the like. In some of the various embodiments, the application control palette may be provided as part of or in addition to one or more user interfaces, such as user interface 500, user interface 600, user interface 700, or the like, for example, as discussed above.

At block 1204, in one or more of the various embodiments, the profiler may add one or more simple field types to the application control palette. In some of the various embodiments, the profiler may add each simple field type to the application control palette based on one or more portions of meta data, such as field type object 414 of meta data 410, for example, as discussed above.

In one or more of the various embodiments, the profiler may select simple field types to add to the application control palette based on various factors, such as user roles (e.g., executive, manager, employee, contractor, or the like), application type (e.g., simulation, content access, item tracking, item modeling, or the like), user location (e.g., end-user location, developer location, or the like), application deployment location (e.g., end-user location, storage location, or the like), or the like.

In some of the various embodiments, the profiler may select various simple field types that are commonly associated with particular user roles, particular types of applications, particular geographic regions, or the like. In some of the various embodiments, the profiler may select various simple field types that are authorized for use by particular user roles, particular types of applications, particular geographic regions, or the like.

In one or more of the various embodiments, the profiler may select one or more languages or other characteristics (e.g., fonts, color schemes, or the like) based on a detected user role, application type, user's geographic location, application deployment geographic location, or the like. In some embodiments, the profiler may determine the user role of a user based on user input, login information, identification badge information, identification information for a computer used by the user, or the like. In some embodiments, the profiler may determine application type based on a user input. In some embodiments, the profiler may determine a user's geographic location or application deployment geographic location based on user input, network address of a computer that may be executing the application, data collected by one or more sensors, such as GPS 258, input/output interface 238, GPS 340, input/output interface 338, or the like.

At block 1206, in one or more of the various embodiments, the profiler may add one or more complex field types to the application control palette. In some of the various embodiments, the profiler may add each complex field type to the application control palette based on one or more portions of meta data, such as one or more definition objects for each complex field type (e.g., definition object 430 for a first complex field type through definition object 432 for an Nth complex field type), for example, as discussed above. In one or more of the various embodiments, the profiler may filter the one or more complex field types similarly to the simple field types, as discussed above.

At block 1208, in one or more of the various embodiments, the profiler may enable a user to design one or more applications based on the application control palette. In some of the various embodiments, the profiler may enable the user to indicate which fields should be included in the application. In some embodiments, the profiler may enable the user to indicate one or more property values or definition values for various properties or definitions of the fields. For example, the profiler may provide one or more of user interface 500, user interface 600, user interface 700, or the like, as discussed above.

At block 1210, in one or more of the various embodiments, the profiler may deploy the application. In some of the various embodiments, the profiler may generate one or more portions of profile information, meta data, application data, or the like, such as profile information 404, meta data 410, application data 412, or the like, as discussed above. In some embodiments, the profiler may store the profile information, meta data, application data, or the like in one or more locations accessible by an application shell, such as web application shell 406, desktop application shell 408, or the like, as discussed above.

In one or more of the various embodiments, the profiler may select various features to employ in the application (e.g., fields, functions, fonts, languages, color schemes, or the like) at runtime based on various factors, such as end-user roles (e.g., executive, manager, employee, contractor, or the like), an end-user's geographic location, application deployment geographic location (e.g., end-user location, storage location, or the like), or the like. In some of the various embodiments, associations between various features and the various factors may be based on user input during application design (e.g., by modifying one or more definition values or property values, as discussed above). In some of the various embodiments, rules for providing the various features based on the associated factors may be based on user input during application design. In some embodiments, the profiler may determine the end-user's role, end-user's geographic location, application deployment geographic location, or the like based on user input, network address of a computer that may be executing the application, data collected by one or more sensors, such as GPS 258, input/output interface 238, GPS 340, input/output interface 338, or the like. In one or more of the various embodiments, the profiler may continue operating until a user configures the profiler to terminate operations. Next, control may be returned to a calling process.

Figure 13:
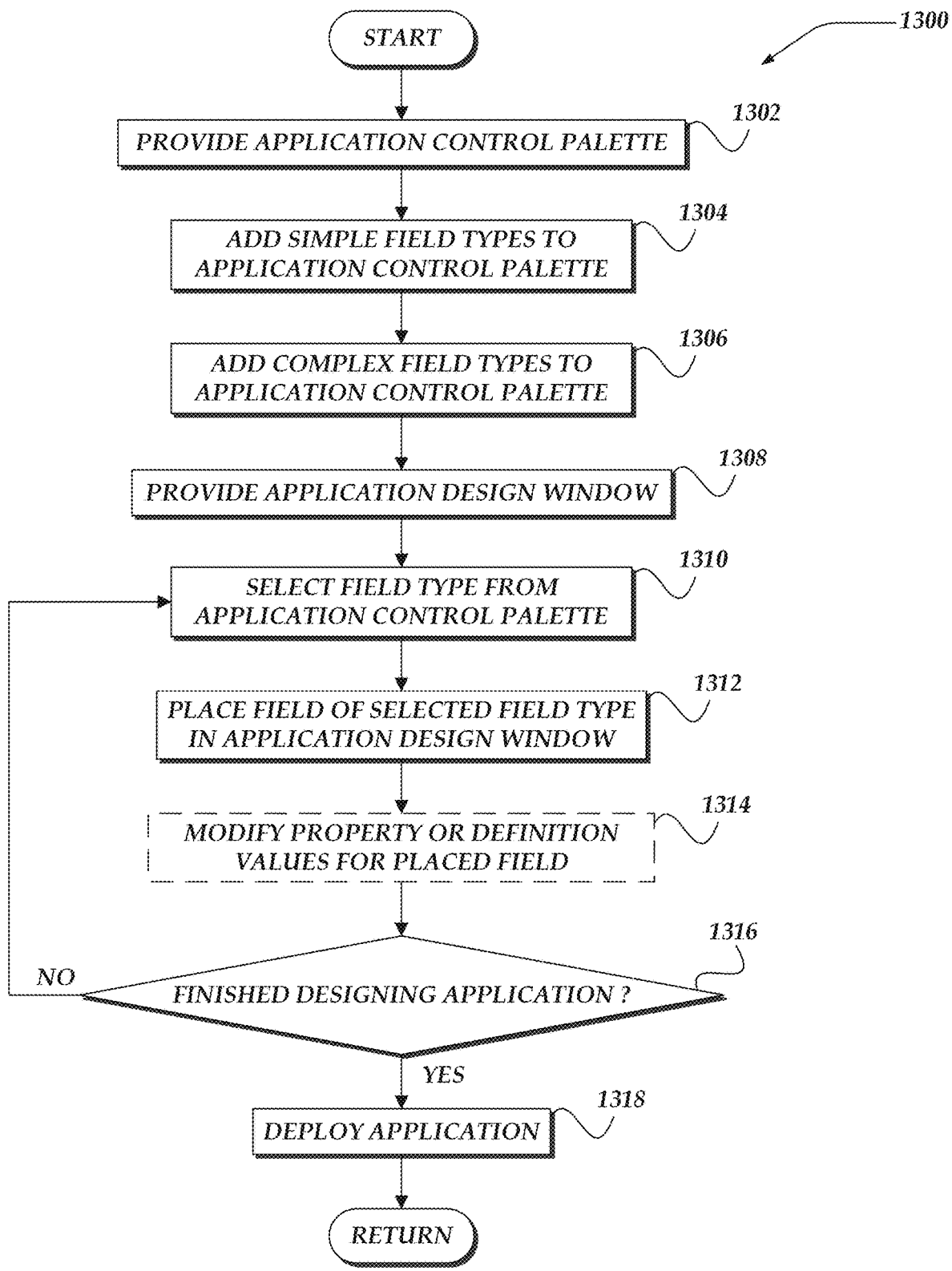
FIG. 13 illustrates a logical flow diagram of an exemplary process for rapid application development via a platform, such as the platform of FIG. 4.

FIG. 13 illustrates a logical flow diagram of an exemplary process for rapid application development via a platform, such as platform 400. After a start block, at block 1302, in one or more of the various embodiments, a profiler (e.g., profiler 400) may be arranged to provide one or more application control palettes as discussed above with regard to block 1202. At block 1304, in one or more of the various embodiments, the profiler may add one or more simple field types to the application control palette as discussed above with regard to block 1204. At block 1306, in one or more of the various embodiments, the profiler may add one or more complex field types to the application control palette as discussed above with regard to block 1206.

At block 1308, in one or more of the various embodiments, the profiler may provide one or more application design windows, such as application design window 504, application design window 704, or the like. In some of the various embodiments, the application design window may be provided as part of or in addition to one or more user interfaces, such as user interface 500, user interface 600, user interface 700, or the like as discussed above. At block 1310, in one or more of the various embodiments, a user may select a field type from the application control palette as discussed above.

At block 1312, in one or more of the various embodiments, the user may place a field of the selected field type in the application design window as discussed above. In some of the various embodiments, the user may be enabled to place the field at a location in the application design window where the field should appear when the application executes. Alternatively, in some embodiments, the field may be arranged to snap to a particular location or layout pattern in the application.

At block 1314, in one or more of the various embodiments, optionally, users may be enabled to modify one or more property values or definition values for one or more properties or definitions of the placed fields. In some of the various embodiments, the user may modify one or more values of a selected property or definition of the field to change its function or appearance. Accordingly, in some embodiments, properties or definitions may represent various features of the fields, such as labels, tool-tips, help files, heights, widths, styles, colors, borders, positions, z-orders, read/write attributes, case sensitivity attributes, or the like.

In one or more of the various embodiments, this block is indicated as being optional because in some embodiments modification of the properties or definitions of placed fields may not be required.

At decision block 1316, in one or more of the various embodiments, if the design of the application may be finished, control flows to block 1318; otherwise, control may loop back to block 1310. In some of the various embodiments, the profiler may determine that the user finished designing the application based on one or more user inputs, such as closing the application design window, closing the application control palette, operating one or more controls, or the like.

At block 1318, in one or more of the various embodiments, the profiler may deploy the application as discussed above with regard to block 1210. In some of the various embodiments, deployment of the application may include generating or populating application data, such as application data 412, application data 900, application data 1100, or the like. In some embodiments, the profiler may generate one or more item objects and one or more supporting objects. In the case of application data 1100, the profiler may generate item object 1102, including attributes associated with each field placed in the application design window, such as loan type attribute, borrower attribute 1110, and cosigner attributes 1112 and 1114. Also in the case of application data 1100, the profiler may generate supporting objects, such as property value object 1104, definition object 1106, lookup object 1108, and complex field item object 1120.

In one or more of the various embodiments, the profiler may populate the supporting objects based on the fields placed in the application design window. For example, the profiler may populate one or more records included in one or more supporting objects with one or more property values or definition values of one or more properties or definitions for each field placed in the application design window, such as records 1116 included in property value object 1104, records 1118 included in definition object 1106, or the like. As another example, the profiler may populate one or more records included in one or more supporting objects with one or more lookup values associated with one or more lookup fields placed in the application design window, such as records included in lookup object 1108. In some of the various embodiments, the profiler may populate one or more item objects or complex field item objects with corresponding item values based on predefined or imported data, such as data imported via importer 442. In some of the various embodiments, the profiler may continue operating until a user configures the profiler to terminate operation. Next, control may be returned to a calling process.

Figure 14:
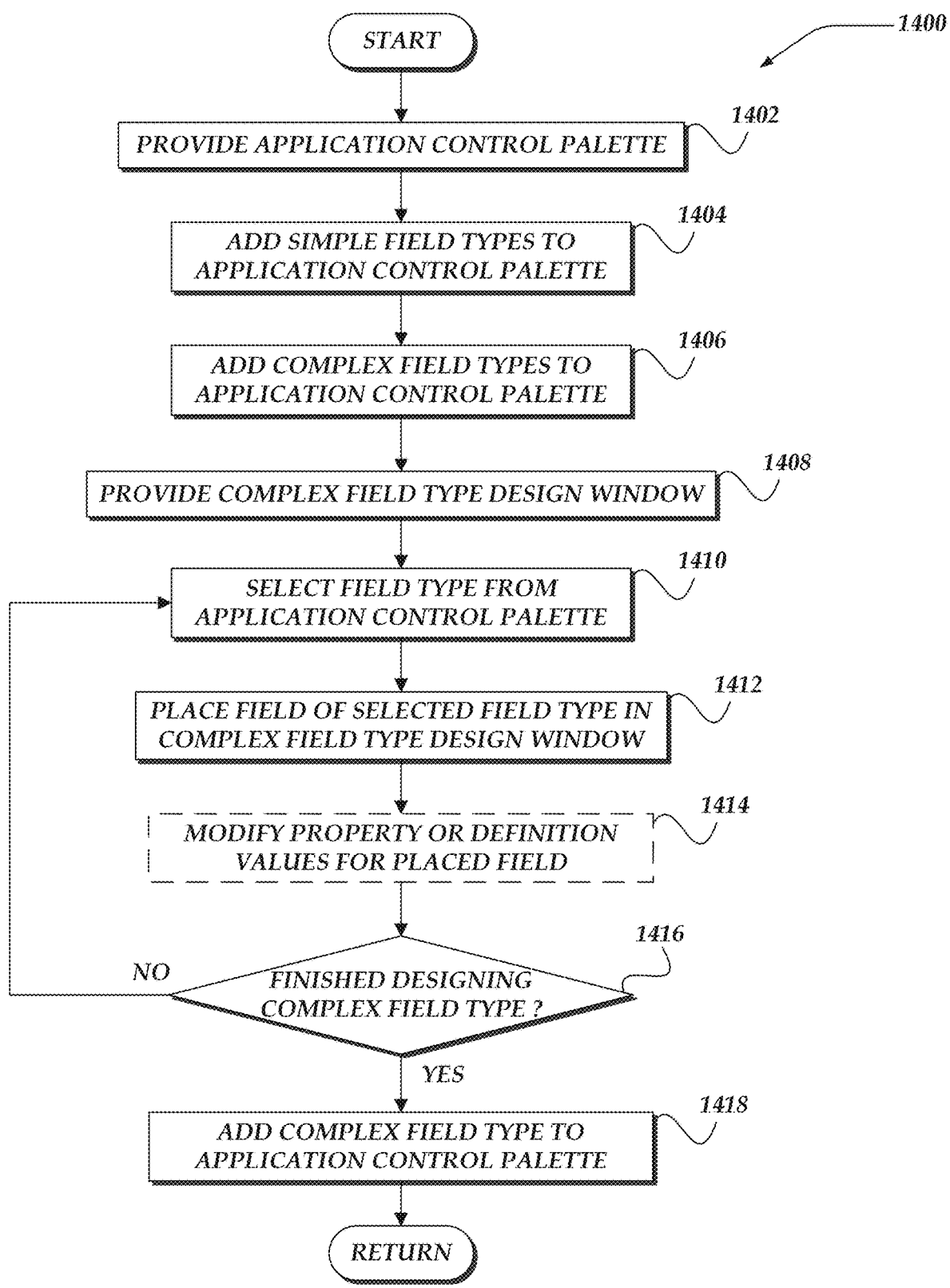
FIG. 14 shows a logical flow diagram of an exemplary process for complex field type development via a platform, such as the platform of FIG. 4.

FIG. 14 shows a logical flow diagram of an exemplary process for complex field type development via a platform, such as platform 400. After a start block, at block 1402, in one or more of the various embodiments, a profiler (e.g., profiler 400) may be arranged to provide one or more application control palettes as discussed above with regard to block 1202. At block 1404, in one or more of the various embodiments, the profiler may add one or more simple field types to the application control palette as discussed above with regard to block 1204. At block 1406, in one or more of the various embodiments, the profiler may add one or more complex field types to the application control palette as discussed above with regard to block 1206.

At block 1408, in one or more of the various embodiments, the profiler may provide one or more complex field type design windows, such as complex field type design window 604 or the like. In some of the various embodiments, the complex field type design window may be provided as part of or in addition to one or more user interfaces, such as user interface 500, user interface 600, user interface 700, or the like as discussed above. At block 1410, in one or more of the various embodiments, a user may select a field type from the application control palette as discussed above.

At block 1412, in one or more of the various embodiments, the user may place a field of the selected field type in the complex field type design window as discussed above. In some of the various embodiments, the user may be enabled to place the field at a location in the complex field type design window where the field should appear in a complex field of the complex field type. Alternatively, in some embodiments, the field may be arranged to snap to a particular location or layout pattern in a complex field of the complex field type.

At block 1414, in one or more of the various embodiments, optionally, users may be enabled to modify one or more property values or definition values for one or more properties or definitions of the placed fields. In some of the various embodiments, the user may modify one or more values of a selected property or definition of the placed field to change its function or appearance. Accordingly, in some embodiments, properties or definitions may represent various features of the placed fields, such as labels, tool-tips, help files, heights, widths, styles, colors, borders, positions, z-orders, read/write attributes, case sensitivity attributes, or the like.

In one or more of the various embodiments, this block is indicated as being optional because in some embodiments modification of the properties or definitions of placed fields may not be required.

At decision block 1416, in one or more of the various embodiments, if the design of the complex field type may be finished, control flows to block 1418; otherwise, control may loop back to block 1410. In some of the various embodiments, the profiler may determine that the user finished designing the complex field type based on one or more user inputs, such as closing the complex field type design window, closing the application control palette, operating one or more controls, or the like.

At block 1418, in one or more of the various embodiments, the profiler may add the complex field type to one or more application control palettes as discussed above, such as application control palette 502, application control palette 602, application control palette 702, or the like. In some of the various embodiments, the profiler may generate or populate meta data, such as meta data 410, meta data 800, meta data 1000, or the like. In some embodiments, the profiler may generate or populate one or more field type objects and one or more supporting objects. In the case of meta data 1000, the profiler may append one or more records that identify the complex field type to field type object 1002, such as record 1010. Also in the case of meta data 1000, the profiler may append one or more records that represent one or more property values of one or more properties for the complex field type to association object 1006, such as records 1012.

In one or more of the various embodiments, the profiler may generate one or more supporting objects based on the fields placed in the complex field type design window, such as complex field type definition object 1014. In some of the various embodiments, the profiler may populate one or more records included in one or more supporting objects with one or more property values or definition values of one or more properties or definitions for each field placed in the complex field type design window, such as records included in complex field type definition object 1014 or the like. In some of the various embodiments, the profiler may continue operating until a user configures the profiler to terminate operation. Accordingly, in one or more of the various embodiments, the newly created complex fields may be made available for use to design applications. Next, control may be returned to a calling process.

Figure 15:
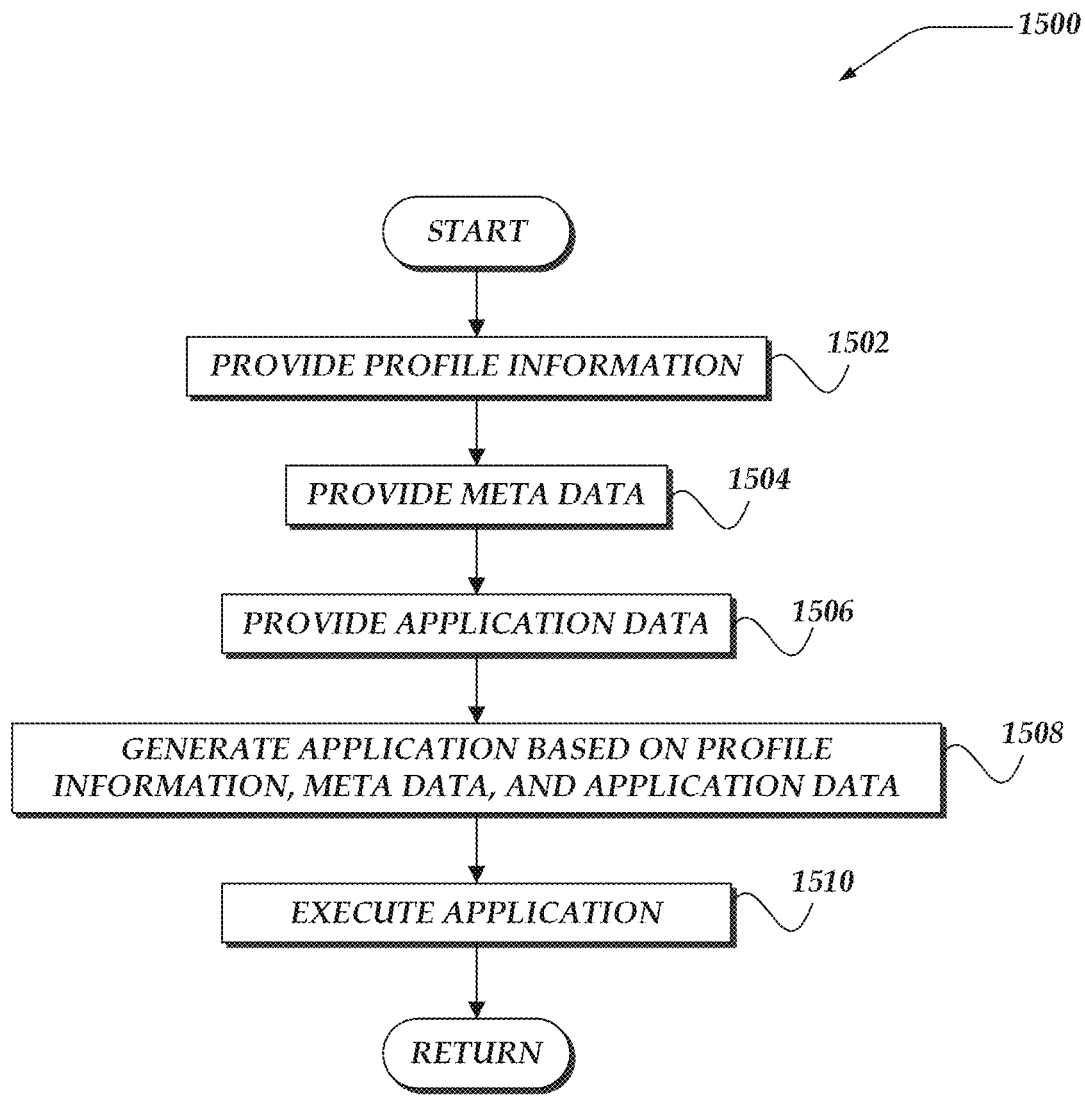
FIG. 15 illustrates a logical flow diagram of an exemplary process for executing an application via a platform, such as the platform of FIG. 4.

FIG. 15 illustrates a logical flow diagram of an exemplary process for executing an application via a platform, such as platform 400. After a start block, at block 1502, in one or more of the various embodiments, an application shell (e.g., web application shell 406, desktop application shell 408, or the like) may be provided with profile information, such as profile information 404. In some of the various embodiments, the application shell may select the profile information based on one or more application identifiers, such as application name, number, storage location, or the like. For example, the application shell may include an application identifier associated with a particular application. As another example, the application shell may select or otherwise obtain the application identifier based on a user's selection of a particular application (e.g., selection from a local list or remote list, entry of an application identifier, or the like), configuration information, or the like.

In one or more of the various embodiments, the profile information may include location information (e.g., file paths, database paths, or the like) that enable the application shell to identify or locate the other data objects used to instantiate the application.

At block 1504, in one or more of the various embodiments, the application shell may be provided with meta data, such as meta data 410, meta data 800, meta data 1000, or the like. In some of the various embodiments, the application shell may select the meta data based on the profile information. For example, the profile information for the application may identify the meta data, such as by name, number, storage location, or the like.

Accordingly, in one or more of the various embodiments, the application shell may traverse the meta data objects to obtain characteristics associated with the simple fields or complex fields that may be used to in the application.

At block 1506, in one or more of the various embodiments, the application shell may be provided with application data, such as application data 412, application data 900, application data 1100, or the like. In some of the various embodiments, the application shell may select the application data based on the profile information. For example, the profile information may identify the application data, such as by name, number, storage location, or the like.

Accordingly, in one or more of the various embodiments, the application shell may be traverse the data objects included in the data model for the application to identify the simple fields, complex fields, item objects, complex item objects, or the like, that may be used during the execution of the application.

At block 1508, in one or more of the various embodiments, the application shell may generate the application based on the profile information, meta data, and application data as discussed above. In some of the various embodiments, the application shell may generate the user interface elements used in the application based on various attributes in one or more item objects or complex field type item objects in the application data, such as item object 902, item object 1102, complex field type item object 1120, or the like.

In one or more of the various embodiments, the application shell may be arranged to instantiate one or more native user-interface elements, such as, user-interfaces controls, user-interface styling, or the like, based on various portions of the meta data or application data.

In one or more of the various embodiments, particular native user-interface controls may be instantiated and bound to application data objects based on the field types, one or more definitions values, property values or the like. In one or more of the various embodiments, if a data object represents a simple field, the application shell may be arranged to instantiate a native user-interface control that is appropriate for the execution environment. For example, in some embodiments, if the application environment is a web browser and a field is a simple text field, the application shell may instantiate a HTML, text input control, or the like, and bind it to the data objects corresponding to field. Likewise, for example, in some embodiments, if the application environment is a native Windows application and the field is a simple text field, the application shell may instantiate a Windows API edit control, or the like, and bind it to the data objects corresponding to field.

In some of the various embodiments, the application shell may render various user interface elements based on various portions of the meta data or application data that represent property values or definition values of properties or definitions for the user interface elements, such as records included in property value object 904, definition object 906, complex field type definition object 1014, property value object 1104, definition object 1106, or the like. Accordingly, in some embodiments, the application shell may determine one or more native features for various user interface elements based on the data binding, such as position, color, shading, or the like. Also, in some embodiments, one or more behaviors of the user interface elements, such as, fonts, styles, colors, or the like may be determined based on the data binding.

At block 1510, in one or more of the various embodiments, the application shell may execute the application. In some of the various embodiments, the application shell may display the generated user interface for the application. In some embodiments, the application shell may enable users to enter data into, manipulate, or otherwise interact with the generated user interface elements.

In some embodiments, the application shell may provide data entered into various user interface elements to various portions of various data objects of the application data, such as records or attributes included in item object 902, item object 1102, complex field type item object 1120, or the like. In some embodiments, the application shell may provide data from various data objects of the application data to various user interface elements, such as records or attributes included in item object 902, item object 1102, complex field type item object 1120, or the like.

In some embodiments, the application shell may validate one or more portions of provided data based on property values or definition values associated with the user interface elements. For example, the application shell may employ one or more property values or definition values of the user interface elements to apply or enforce constraints, such as masks, required fields, tab order of fields, or the like. In some of the various embodiments, the application shell may continue to execute the application until a user configures the application shell to terminate. Next, control may be returned to a calling process.

As indicated throughout this disclosure, the described embodiments provide numerous and substantial benefits to the technical field. For instance, the embodiments increase the speed of application development and modification by reducing the number of individual simple fields that are placed, arranged, or modified. The embodiments also improve the technical field by reducing the complexity of the application data structure by reducing the amount of repeated common data elements that are used to provide the disclosed functionalities.

In addition to the above benefits, the embodiments also improve the technical field by providing an improved hierarchy that maintains data integrity. Using the loan examples recited previously, it may be the case that a single loan requestor has multiple different loans with a financial organization. Each of those records includes details regarding the loan, but each record also includes details regarding the characteristics of the loan requestor (e.g., perhaps name, social security number, driver's license number, address, and so on). In this regard, all of these loan records are linked or connected with one another because the loan requestor is the same individual or entity.

By using the described complex data fields, the embodiments are able to maintain consistency and data integrity between linked or related records. For instance, suppose a loan requestor were to update his/her address or some other tracked characteristic for a particular one loan data entry. With traditional technologies, the other loan data entries or records that were not modified would not reflect the updated characteristic, thereby leading to a discrepancy, a discontinuity, or a situation involving inconsistent data between the records, which should all be consistent but now are not.

The disclosed embodiments solve that problem via use of the complex data field. Specifically, when one record is linked or has an association with another record (e.g., in the case where a loan requestor has multiple different loans), the act or process of modifying common data that is common among all the records triggers the system to make changes not only to the immediate record being modified but also to the other records that are linked to the immediate record. That is, if the loan requestor's address were modified in one record, then this modification will automatically update the address information for those other records to also reflect the address change. By automatically updating the common data for all records, the embodiments beneficially maintain data integrity across different data entries/records having common or shared characteristics.

What is claimed is:

1. A method for enabling rapid development of an application whose user interface (UI) is being designed, said method comprising:
    configuring a data model defining a data object, wherein:
        the data model determines which one or more field types will be included in an application control palette, the application control palette being configured to enable a selectable UI field, which has a type defined by the one or more field types, to be added to the UI, which is being designed for the application,
        each record in the data object defines a corresponding set of one or more attributes for a corresponding field having one of the one or more field types,
        each record in the data object corresponds to a simple field type or to a complex field type, the simple field type refers to a field that includes only a single field and the complex field type refers to a field that includes multiple fields, and
        the data object simultaneously includes both a first simple field type and a reference to a first complex field type;
    displaying an application design window configured to enable design of the UI, wherein the application design window includes a selectable complex field that, upon selection, can be added to the UI, and wherein the selectable complex field is of the first complex field type referenced by the data object;
    receiving user input in the application design window; and
    based on the user input, causing the selectable complex field to be added to the UI.

2. The method of claim 1, wherein the one or more attributes for fields having the one or more field types includes a label attribute.

3. The method of claim 1, wherein the one or more attributes for fields having the one or more field types includes a tool-tip attribute.

4. The method of claim 1, wherein the one or more attributes for fields having the one or more field types includes a help file attribute.

5. The method of claim 1, wherein the one or more attributes for fields having the one or more field types includes a height attribute.

6. The method of claim 1, wherein the one or more attributes for fields having the one or more field types includes a width attribute.

7. The method of claim 1, wherein the one or more attributes for fields having the one or more field types includes a style attribute.

8. The method of claim 1, wherein the one or more attributes for fields having the one or more field types includes a color attribute.

9. The method of claim 1, wherein the one or more attributes for fields having the one or more field types includes a border attribute.

10. The method of claim 1, wherein the one or more attributes for fields having the one or more field types includes a position attribute.

11. The method of claim 1, wherein the one or more attributes for fields having the one or more field types includes a z-order attribute.

12. The method of claim 1, wherein the one or more attributes for fields having the one or more field types includes a read-only attribute.

13. The method of claim 1, wherein the one or more attributes for fields having the one or more field types includes a case sensitivity attribute.

14. The method of claim 1, wherein the one or more field types include a drop-down list field type.

15. The method of claim 14, wherein the one or more field types include a scrollable list field type.

16. The method of claim 1, wherein the complex field includes a first field having a string field type, a second field having a drop-down list field type, and a third field having a date field type.

17. The method of claim 16, wherein the complex field further includes a fourth field having a currency field type.

18. The method of claim 17, wherein the complex field further includes a fifth field having a percentage field type.

19. A computer system configured to enable rapid development of an application whose user interface (UI) is being designed, said computer system comprising:
one or more processors; and
one or more computer-readable hardware storage devices that store instructions that are executable by the one or more processors to cause the computer system to:
configure a data model defining a data object, wherein:
the data model determines which one or more field types will be included in an application control palette, the application control palette being configured to enable a selectable UI field, which has a type defined by the one or more field types, to be added to the UI, which is being designed for the application,
each record in the data object defines a corresponding set of one or more attributes for a corresponding field having one of the one or more field types,
each record in the data object corresponds to a simple field type or to a complex field type, the simple field type refers to a field that includes only a single field and the complex field type refers to a field that includes multiple fields, and
the data object simultaneously includes both a first simple field type and a reference to a first complex field type;
display an application design window configured to enable design of the UI, wherein the application design window includes a selectable complex field that, upon selection, can be added to the UI, and wherein the selectable complex field is of the first complex field type referenced by the data object;
receive user input in the application design window; and
based on the user input, cause the selectable complex field to be added to the UI.

20. One or more computer-readable hardware storage devices that store instructions that are executable by one or more processors of a computer system to cause the computer system to:
configure a data model defining a data object, wherein:
the data model determines which one or more field types will be included in an application control palette, the application control palette being configured to enable a selectable UI field, which has a type defined by the one or more field types, to be added to the UI, which is being designed for the application,
each record in the data object defines a corresponding set of one or more attributes for a corresponding field having one of the one or more field types,
each record in the data object corresponds to a simple field type or to a complex field type, the simple field type refers to a field that includes only a single field and the complex field type refers to a field that includes multiple fields, and
the data object simultaneously includes both a first simple field type and a reference to a first complex field type;
display an application design window configured to enable design of the UI, wherein the application design window includes a selectable complex field that, upon selection, can be added to the UI, and wherein the selectable complex field is of the first complex field type referenced by the data object;
receive user input in the application design window; and
based on the user input, cause the selectable complex field to be added to the UI.

\* \* \* \* \*